US007729952B1

(12) United States Patent
Kulesza et al.

(10) Patent No.: US 7,729,952 B1
(45) Date of Patent: Jun. 1, 2010

(54) METHOD AND SYSTEM FOR CUSTOM GIFT BASKET ASSEMBLY

(75) Inventors: Shaun Kulesza, Littleton, CO (US); Janelle Kulesza, Littleton, CO (US)

(73) Assignee: Just Because Baskets, LLC, Littleton, CO (US)

( * ) Notice: Subject to any disclaimer, the term of this patent is extended or adjusted under 35 U.S.C. 154(b) by 0 days.

(21) Appl. No.: 11/832,503

(22) Filed: Aug. 1, 2007

Related U.S. Application Data

(60) Provisional application No. 60/820,998, filed on Aug. 1, 2006.

(51) Int. Cl.
*G06Q 30/00* (2006.01)
(52) U.S. Cl. .......................................... 705/26; 705/27
(58) Field of Classification Search .................. 705/26, 705/27; 708/26, 27
See application file for complete search history.

(56) References Cited

U.S. PATENT DOCUMENTS

| | | | | |
|---|---|---|---|---|
| 5,930,769 | A * | 7/1999 | Rose | 705/27 |
| 6,167,383 | A * | 12/2000 | Henson | 705/26 |
| 6,182,275 | B1 * | 1/2001 | Beelitz et al. | 717/175 |
| 6,247,128 | B1 * | 6/2001 | Fisher et al. | 713/100 |
| 7,003,526 | B1 * | 2/2006 | Lee et al. | 707/102 |
| 7,188,333 | B1 * | 3/2007 | LaMotta et al. | 717/106 |
| 7,216,092 | B1 * | 5/2007 | Weber et al. | 705/26 |
| 7,590,570 | B2 * | 9/2009 | Harrison et al. | 705/27 |
| 2002/0004749 | A1 * | 1/2002 | Froseth et al. | 705/16 |
| 2002/0069156 | A1 * | 6/2002 | Adam et al. | 705/37 |
| 2003/0033219 | A1 * | 2/2003 | Kasahara et al. | 705/27 |
| 2003/0069809 | A1 * | 4/2003 | von Rosen et al. | 705/26 |
| 2003/0126139 | A1 * | 7/2003 | Lee et al. | 707/100 |
| 2006/0085272 | A1 * | 4/2006 | Case et al. | 705/26 |
| 2006/0161481 | A1 * | 7/2006 | Krulik | 705/26 |
| 2006/0224462 | A1 * | 10/2006 | Brezenoff | 705/26 |

(Continued)

OTHER PUBLICATIONS

JustBecauseBaskets, May 2005 http://archive.org/web/*/http://justbecausebaskets.com/.*

(Continued)

*Primary Examiner*—Jeffrey A Smith
*Assistant Examiner*—Matthew Zimmerman
(74) *Attorney, Agent, or Firm*—Marsh Fischmann & Breyfogle LLP; Libby A. Huskey

(57) ABSTRACT

Structure and functionality, including web-related (client and/or server side) structure and functionality are provided for use in custom basket design, assembly, evaluation and delivery. Orders from a website, an inbound call center, a sales representative or other source are placed in a non-processed order bin (102). In the case of the website orders, senders are assisted in custom basket assembly and shipping costs are calculated on a basket-specific basis. Specialists at an item pick station (104) select orders from the bin (102) and retrieve items to be assembled into a basket from inventory, as well as the basket vessel itself. The items are then placed into a production queue (106) where they are accessed by specialists at basket build stations (108). The basket is assembled at the basket build station (108), and a digital photograph of the completed basket it taken. The basket then passes to a shrink-wrap station (110) where a custom card may be associated with the basket, and the basket is otherwise prepared for shipping at the ship/store station (112). In this manner, custom baskets can be efficiently assembled and delivered to recipients.

31 Claims, 33 Drawing Sheets

U.S. PATENT DOCUMENTS

2007/0136150 A1 * 6/2007 Biancavilla et al. ........... 705/28

OTHER PUBLICATIONS

DesignItYourselfGiftBaskets, Mar. 2005 http://archive.org/web/*/http://justbecausebaskets.com/.*

Aquarelle.com, Jun. 2004 http://web.archive.org/web/20040610070606/www.aquarelle.com/html/shop_en.htm.*

DesignItYourselfGiftBaskets, Mar. 2005 http://archive.org/web/*/http://www.designityourselfgiftbaskets.com/.*

* cited by examiner

METHOD AND SYSTEM FOR CUSTOM GIFT BASKET ASSEMBLY

CROSS-REFERENCE TO RELATED APPLICATION

This application claims priority under 35 U.S.C. 119 to U.S. Provisional Application No. 60/820,998, entitled: "SYSTEM FOR CUSTOM BASKET ASSEMBLY, EVALUATION AND DELIVERY," filed on Aug. 1, 2006, the contents of which are incorporated herein as if set forth in full.

FIELD OF INVENTION

The present invention relates generally to processes and systems for providing gift baskets and, in particular, to assisting senders who desire to efficiently and effectively send custom gift baskets to a recipient or multiple recipients.

BACKGROUND OF THE INVENTION

In many eases, individuals may desire to conveniently send a customized selection of products to a recipient, e.g., a gift basket, care package (in a basket or other vessel) or the like (generically, "basket"). For example, various professionals, such as real estate agents, attorneys, businessmen and others, may desire to send a basket to clients, customers or business associates to commemorate an important event or transaction, or simply to engender good will. Similarly, outside of the business context, an individual may wish to send a basket to a family member, friend or other associate in connection with a holiday, birthday, wedding, funeral, medical event, other event or for no particular reason.

In many cases, the options available for sending baskets have been inconvenient or otherwise less than optimal. One option, of course, is to manually purchase, assemble package and ship (or otherwise deliver) a basket to the desired recipient or recipients. However, this is generally inconvenient and may not result in a particularly desirable product if the sender does not happen to be skilled in this endeavor.

In recognition of the potential market for basket construction and delivery, specialized retail outlets have emerged. Typically, these retail outlets, which may be located in malls, have a selection of baskets from which a sender can choose. In some cases, these baskets are limited to a particular product area such as chocolates or other candies, floral products, meats and cheeses, etc. As a practical matter, the options of products that may be included in baskets at such retail outlets (as well as the baskets themselves) are limited by space and inventory management considerations. Moreover, sending baskets in this manner allows for limited (if any) customization of the baskets and is not convenient for all senders as a visit to the retail outlet may be required in order to fully appreciate the options that are available.

It is noted that many basket senders would like to customize baskets for each recipient. That is, it is expected that a recipient will be more satisfied with a basket that was manifestly selected with the recipient in mind. For example, a good realtor may come to learn a lot about a client in connection with a search for a new home. A home purchase is a significant purchase so a realtor may spend significant time with a client. Moreover, because the purchase of a home involves many subjective considerations, a realtor typically needs to understand the tastes and desires of a client to identify homes of potential interest.

When a home purchase is consummated, many realtors would like to provide a gift basket (e.g., left at the purchased home) and are in a position to customize such a basket to the tastes and desires of the recipient. For many realtors, this is thoughtful and good business. However, while the realtor may have the insight necessary to customize a basket, the realtor may not have the time and skill necessary to construct a basket that has the desired effect. Moreover, as one purpose of the basket is to cement the relationship, it would be ideal, in many cases, if the basket could include branded items, or otherwise include durable contact or reminder information.

DESCRIPTION OF THE INVENTION it has been recognized that designing baskets that are pleasing and achieve the desired effect is not easy. Many senders are first-time senders or send baskets infrequently and, therefore, may be uncertain how to design a pleasing basket. Even regular senders may not have natural skills in basket design. As a result, a number of errors can occur in basket design. One of the most common errors, especially when the basket and contents are remotely selected (e.g., via the phone or internet) is properly fitting the basket contents to the basket vessel so that the basket looks neither crowded nor sparse. Another common error is selecting contents that fail to define a theme or otherwise combine harmoniously. Clearly, it would useful to provide a system for assisting senders in this process, while allowing for personalization or other customization.

In addition, it has been recognized that allowing for customization of baskets can result in inefficiencies or inequities related to shipping. In general, the factors that affect shipping cost include the shipping company/modality and the size and weight of the basket, as well as any need to cold pack the basket or otherwise provide for specialized packaging/shipping. In this regard, many items commonly included in gift baskets, e.g., chocolates, are heat-sensitive and may require cold packing—at least when sent during warm months or to warm climates. Such cold packing may entail use of an insulated shipping box and frozen gel packs, which adds to shipping expense. These shipping-related factors can vary considerably in relation to package customization. While it would be possible to manually calculate a shipping cost for each basket, this would be cumbersome and may be impractical for remote senders. Accordingly, it is common to charge a shipping cost that does not specifically address the characteristics of a custom basket, resulting in overcharging and/or undercharging senders.

The present invention is directed to certain structure and functionality, including web-related (client and/or server side) structure and functionality, for use in custom basket design, assembly, evaluation and delivery. The invention enables senders, even first-time or unskilled senders, to design a custom basket with confidence that the basket contents will fit the basket vessel and that the finished product will otherwise be pleasing and achieve the desired effect. In addition, the invention allows companies or other sender associations to discreetly provide branded selections for baskets, so as to combine expert basket creation functionality with private source marketing advantages. Moreover, the invention allows for accurate determination of shipping costs for custom baskets.

In accordance with one aspect of the present invention, a method and apparatus (collectively "utility") is provided for ensuring a proper fit between basket contents and a basket vessel. This aspect of the invention is implemented in connection with a web-based tool for receiving inputs defining a gift basket. The web-based tool is used to receive inputs at least relating to one or more products for inclusion in the basket. In response to these inputs, logic is executed for making a determination regarding a likely fit of the products to a basket vessel. In a simple implementation, this may involve establishing a minimum threshold for products that may be included in a basket, e.g., a minimum number of products or a minimum money value of products that may be specified for a basket. In this regard, for example, it may be determined (based on experience or for business reasons) that if the value of products specified for a basket or basket type is less than 20 dollars that the products are unlikely to result in a satisfactory basket, even if the smallest appropriate basket vessel is utilized. It may also be useful to define an upper threshold. For example, it may be determined that products having a money value in excess of 500 dollars are unlikely to fit even the largest vessel. Such orders may reflect a mistake by the sender in entering the order, or may require multiple basket vessels.

In a more advanced implementation, specific product information (e.g., weight and/or dimensions) may be compared to specific basket vessel information (e.g., capacity or dimensions) to make the determination regarding fit. For example, the number of products, the dimensions or cumulative dimensions of the products or the like may be compared to the type or size of a basket vessel. Based on this comparison, it may be determined that the basket vessel is too large or too small in relation to the selected products, resulting in a basket that is too crowded or too sparse. An output may be provided to the sender reflecting this determination. For example, the sender may receive an error message indicating that the basket vessel is too large or too small (or, conversely, that not enough or too many products have been selected, for the basket vessel). Alternatively, a different basket vessel may be substituted for that originally selected by the sender, or where the sender has selected a type of basket vessel that is available in multiple sizes, the correct size vessel may be automatically selected. In this manner, a more satisfactory basket can be consistently created, even by inexperienced or unskilled senders.

In accordance with another aspect of the present invention, a utility is provided for determining a shipping price for a custom basket based on specific characteristics of the basket. The utility involves receiving, via a web-based tool, information defining a custom gift basket that includes a combination of products specified by a sender. In this regard, at least one of the products of the combination is selected by a sender. For example, the sender may specifically select each of the products, or the sender may modify a predefined combination by adding or substituting at least one product into the combination. Based on the specified combination of products, the tool accesses stored information concerning at least one of a size, a weight and specialized packing for one or more of the products. For example, the tool may access a look-up table of sizes and weights for one or more of the products. Additionally or alternatively, the tool may access stored information indicating that one or more of the stored products require cold packing, e.g., in the case of chocolates or other perishables. The tool is further operative to receive input information regarding a desired type of shipping for the custom gift basket. For example, the sender may specify a particular shipping company or speed of shipping (e.g., next-day vs. ground transportation). Based on this input information, logic is executed to determine a shipping cost and to provide an appropriate output to the sender reflecting the shipping cost. The shipping cost is thus based on specific characteristics of the basket, as well as shipping preferences, so that shipping costs can be assessed in a fair and efficient manner.

In accordance with a still further aspect of the present invention, a utility provides a branded website for use by authorized basket senders. The utility involves receiving, via a web-based tool, input information identifying a group association of a sender. For example, a sender may identify a company association, e.g., a realtor may identify his employer. Based on this group association, the tool can generate web pages including branding information, e.g., familiar trademarks, logos and other graphical elements, of the group. The tool may also identify product options for inclusion in the gift basket, wherein at least some of the product options are specific to the group association. Thus, for example, if a realtor identifies his employer, the realtor may then be allowed to access one or more realtor branded web pages that may include general merchandise as well, as branded merchandise (e.g., mugs, coffee, specialty food products, printed material and the like, bearing trademarks of the sender's employer). The web-based tool can then be used to construct a custom basket, for example, including at least one product option specific to the group association. In this manner, senders feel more comfortable due to the familiar appearance or feel of the branded site. In addition, senders and their employers gained the benefit of providing branded products while leveraging the expertise of a third party expert custom basket tool.

In accordance with a still further aspect of the present invention, a utility is provided for supporting affiliate organizations in designing, assembling and shipping custom baskets. This can be implemented in a variety of ways. As discussed above, a branded website, or co-branded website (including information identifying the basket site and the affiliate), can be hosted by the basket site operator. Such a website may be accessed by authorized users or may be more generally available. Alternatively, users at affiliate sites may link to the basket site to access custom basket functionality, as described herein, with respect to product offerings otherwise available at the affiliate site. As a further alternative, the noted basket site functionality may be made available at the affiliate site from the perspective of the user.

In one implementation, the associated utility involves providing form or template information for presentation in connection with an affiliate website. The template information defines a number of fields of information that are substantially sufficient to enable the design, assembly and shipping processes. Preferably, the template is further useful in returning information in a format (e.g., with metadata identifying the data fields so that the data is self-describing) that can be readily used in the basket design, assembly and shipping processes at a fulfillment center. The fulfillment center operator may then simply receive a verification of payment from the affiliate to execute the order. Appropriate accounting mechanisms can be implemented for transferring funds between the fulfillment center operator and the affiliate and generating appropriate documentation. In this manner, the expertise and technology of the custom basket provider can be provided in connection with affiliate sites without noticeably redirecting the sender from the affiliate site as may be desired. Moreover, information from a shopping cart need not be shared as between an affiliate site and a basket fulfillment site as may be problematic from a security perspective.

In accordance with another aspect of the present invention, a utility is operative to generate images, e.g., digital photographs, of a custom basket. Some senders may resist using a remote tool, e.g., via the Internet or telephone, to send a custom basket because they never get to see the end result. The present aspect of the invention addresses this concern by: receiving input information regarding a desired gift basket; responsive to this information, constructing the custom gift basket; obtaining an image of the constructed custom gift basket; and electronically providing the image to the sender. For example, the construction and shipping process may include a station for obtaining a digital image of the completed basket. This digital image may then be e-mailed or otherwise made available for electronic access by the sender.

In accordance with a still further aspect of the present invention, a utility is provided for associating custom, cards with a basket. As noted above, baskets can be more effective in achieving their desired effect if the baskets are manifestly customized for a particular recipient or event. One way of doing this is by attaching a custom card to the basket. The present utility involves receiving input information regarding a desired gift basket, receiving uploaded graphical information from the sender and using the uploaded graphical information to construct a card for inclusion with the gift basket. For example, the graphical information may be a digital photograph, a logo or other design or other graphical information. For example, a realtor may attach his picture and contact information or a picture of a purchased property to the card.

In accordance with another aspect of the present invention, a utility is provided for simplifying a process for sending multiple baskets. It has been recognized that, in many cases, a sender may desire to send baskets to multiple recipients. For example, a professional may wish to send baskets to each individual on a large client list in connection with a holiday or other event. Other senders may wish to send baskets to multiple family members, friends or other associates. Conventionally, this is a cumbersome process as the sender may be required to proceed through an entire process of constructing a basket and checking out multiple times. A simplified process in accordance with the present invention involves receiving, via a web-based tool, first input information related to a first basket for a first recipient, receiving second input information relating to a second basket for a second recipient and providing a single check-out process to pay for the first and second baskets. A single checkout process for a large number of baskets may be accommodated in this manner, thereby providing an efficient mechanism for such purposes.

BRIEF DESCRIPTION OF THE DRAWINGS

For a more complete understanding of the present invention and further advantages thereof, reference is now made to the following detailed description, taken in conjunction with the drawings, in which:

FIGS. 12-31 are screenshots summarizing various functionality in accordance with the present invention.

DETAILED DESCRIPTION

The present invention relates to the design, assembly, evaluation and shipping of custom baskets to a recipient or recipients. A number of issues are addressed in this regard, including, for example, assisting senders in selecting a basket vessel and contents, matching the vessel to the contents so as to provide an attractive end product, determining shipping costs in connection with customized products, allowing for inclusion of branded materials in baskets and addressing a number of matters in relation to affiliate websites. Associated structure and functionality is described in more detail below.

The following discussion begins with a general description of the basket assembly process and facility. Thereafter, a number of novel features relating to custom basket design and delivery are addressed. Finally, the functionality of an associated website is summarized in relation to a number of exemplary screenshots.

Figure 1:
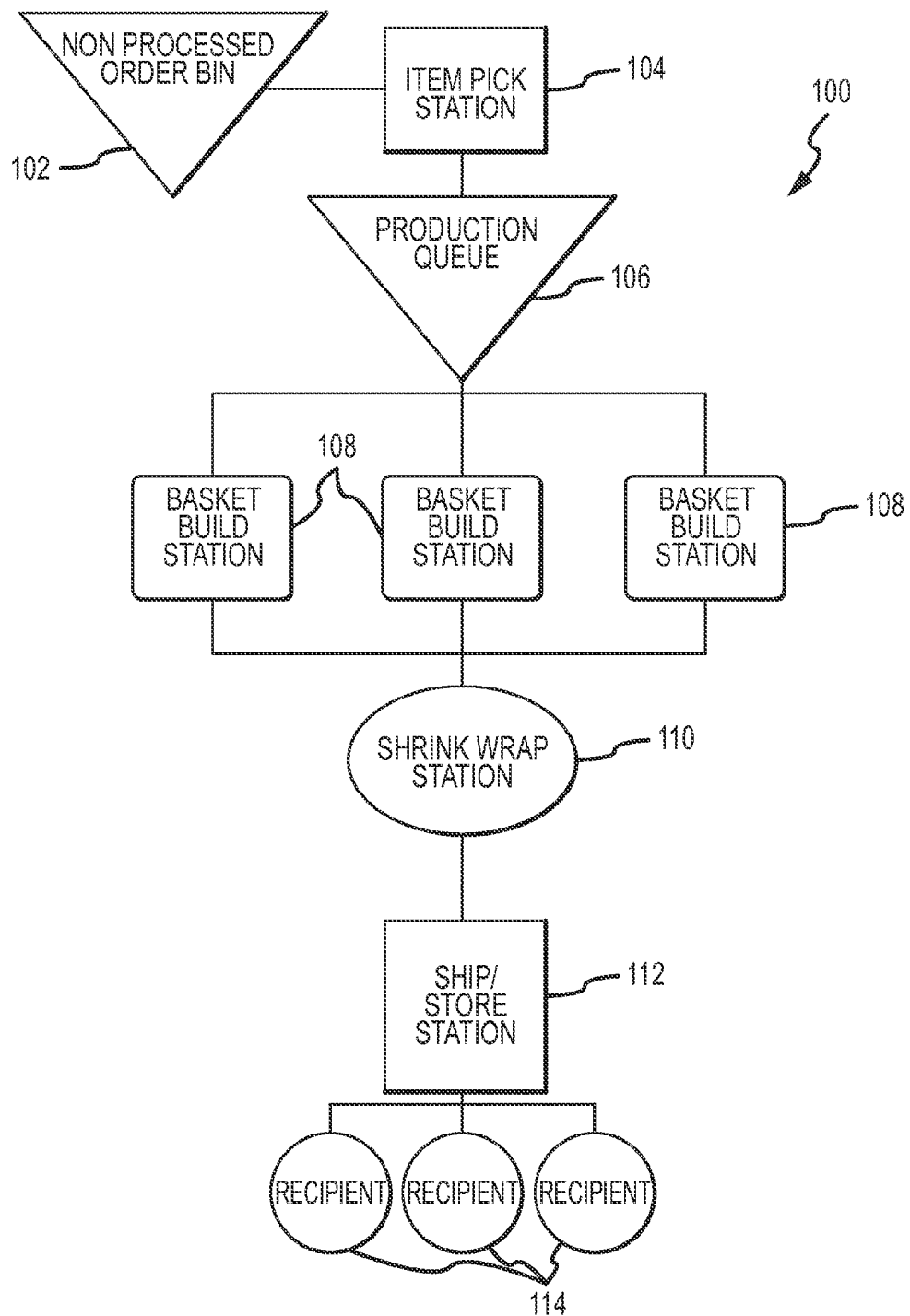
FIG. 1 is a schematic diagram of a manufacturing system for manufacturing custom baskets in accordance with the present invention.

The manufacturing facility 100 is illustrated in FIG. 1. As will be described in more detail below, orders are received from senders via a website, phone or other source. These orders are then processed by facility 100. The first station of the illustrated facility 100 is the non-processed order bin 102. The non-processed order bin 102 is the repository for all orders to be processed. Orders are only placed into the non-processed order bin 102 upon final confirmation, e.g., upon entry of payment in connection with the website.

The next production station, in the illustrated production process, is the item pick station 104. At the item pick station 104 all of the items to be assembled into the basket are retrieved from inventory together with the basket vessel itself. This process, like the processes executed at the other production stations described herein, may be fully automated, partially automated or fully manual. In the case of a manual process, a specialist retrieves an order from the non-processed order bin 102. For example, the order may be a printed document generated upon placement of the order through the website. The order may identify the basket vessel, as well as all the products selected for inclusion in the basket vessel. Each of these items may be associated with a code or inventory location to assist the specialist in retrieving the items from inventory. Once all of the items have been selected, the items can be gathered together, e.g., by collecting the items in the basket vessel, and the collected items are placed into the production queue 106. Also, at the item pick station 104, an identifier such as a barcode may be associated with the basket. This barcode can be used at subsequent stations to allow workers to access a file for convenient processing.

In the illustrated implementation, there are a number of basket build stations 108. Any number of basket build stations 108 may be utilized as required by the volume of orders, which may change seasonally. In one implementation, each basket build station 108 includes a barcode reader associated with a computerized workstation. The worker receives the collection of items and scans in the barcode. Upon scanning in the barcode, information related to the order is displayed on a monitor. For example, the sender name and basket assembly instructions may be displayed. In the latter regard, if the basket is a predefined basket, such as a predefined corporate basket, instruction for basket assembly may be displayed. In the case of a custom basket, general guidelines for basket assembly may be displayed. At this station, the basket specialist may also double-check the basket contents for accuracy. In addition, at the basket build station 108, a digital photograph of the completed basket may be taken and emailed to the sender if an email address is available.

From the basket build station 108, the basket is passed to the shrink-wrap station 110. At the shrink-wrap station 110, a quality control check may be performed to identify any defects in the basket. Again, the shrink-wrap station 110 may include a barcode reader and a computer terminal. The specialist at station 110 scans in the barcode and then has access to information regarding the basket on the computer screen. If the sender has ordered a gift card for inclusion in the basket, the gift card may be printed at station 110 and attached to the basket, as will be discussed in more detail below. This may include custom gift cards with uploaded graphics. A bow and any additional details as desired may also be added at the shrink-rap station 110. The completed basket is then passed through a shrink-wrap machine. Each basket is assigned a tracking number for shipping purposes, and this tracking number can be recorded in the basket file. In addition, a notation may be entered into the file to show that the process is finished. The basket is then forwarded to the ship/store station 112 for packaging.

At the ship/store station 112, a final check is performed on the basket, and the basket is wrapped in bubble-wrap and packaged with appropriate packaging materials and sealed with tape. The package is then either shipped out or stored to be shipped out at a later date as requested by the sender. Once this process is completed, the basket is shipped, and appropriate entry may be made into the basket file to show that the basket has been shipped. In addition, shipping of the basket may trigger certain accounting functions, for example, in relation to settling accounts with affiliates.

Figure 2:
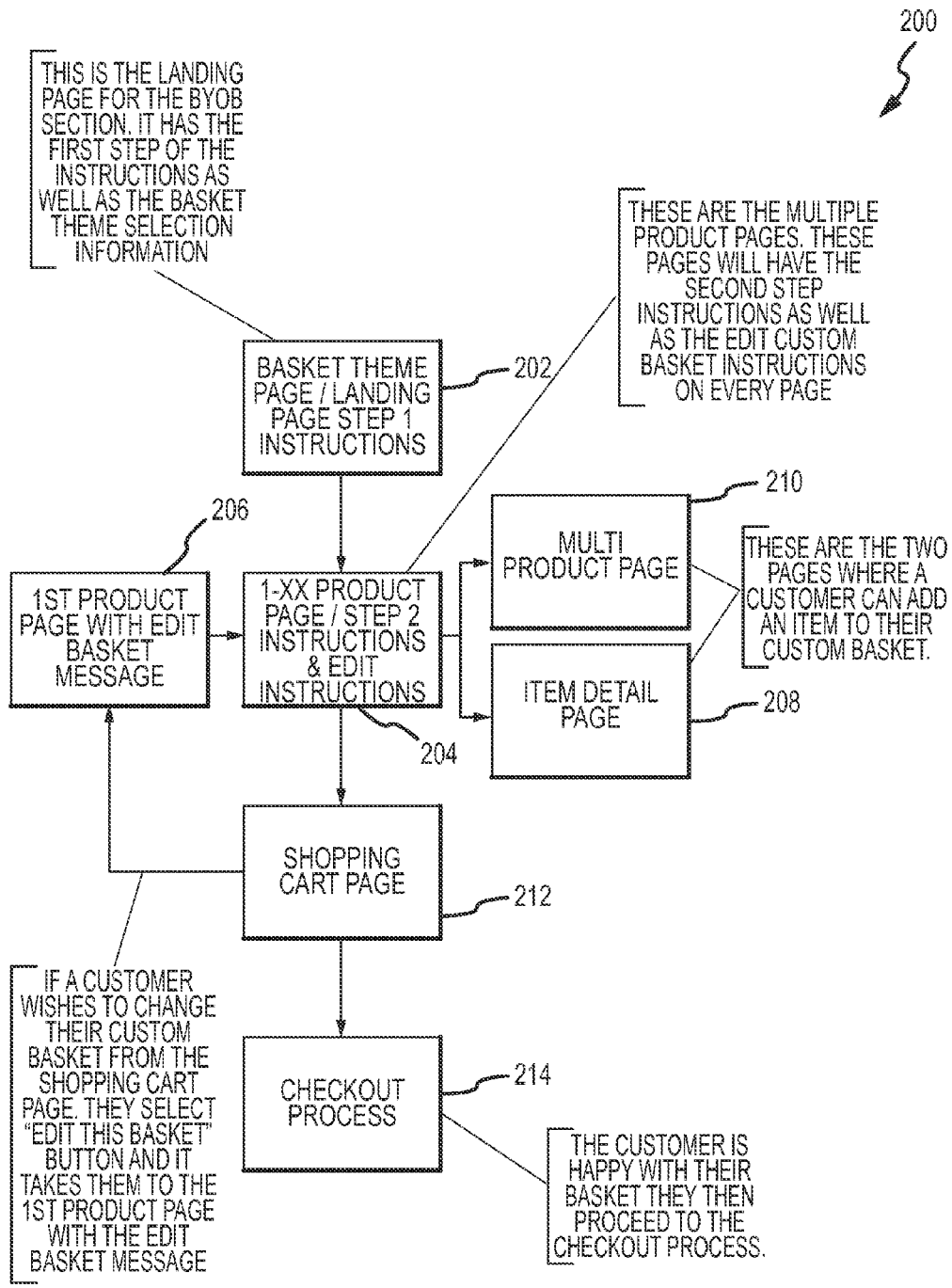
FIG. 2 is a schematic diagram of a process for guiding a sender through assembly of a custom basket in accordance with the present invention.

An important feature of the present invention is enabling website senders to select custom baskets. As discussed above, the ability to customize a basket allows for more thoughtful gifting and a more satisfactory product. The process 200 for building a custom basket is shown in FIG. 2. From an initial page, such as a homepage, of the basket website, senders may select items to build their of baskets and enter an appropriate input. The senders will then be linked to a basket theme page 202. At this page 202, the senders receive general instructions for building their own baskets, as well as selecting a theme for the basket, e.g., from a pull-down list of possible themes. Once the sender has completed this process, the sender advances to one or more product pages 204. At a first product page 206, the sender receives instructions with an edit basket message. It will be appreciated that the custom basket may be formed from scratch, or a predefined basket may be used as a starting point and then edited by the sender. In either case, the sender can edit the basket by adding or deleting a basket vessel or items for inclusion in the basket vessel.

Items may be added to the basket at either the multi-product page 210 or the item detail page 208. On the multi-product page 210, the sender can view and receive basic information regarding multiple products. A product can be selected on this page. If the sender desires more information about a particular product, the sender can click on an appropriate button and is then transferred to an item detail page 208. This page includes more detailed information about a specific product. The sender can also add a product to the basket at the item detail page 208. As the sender enters items to the basket, the sender moves to a shopping cart page 212. At the shopping cart page 212, the sender can view a running total of the items selected and the cost of the basket to date. From the shopping cart page, the sender can select a button, such as "enter this basket," and be returned to a product page to edit the basket contents. Once the sender is happy with the basket, the sender passes to the checkout process 214. In the checkout process, the sender receives final pricing information, including shipping costs, and enters payment information. In addition, the sender may select from among shipping options, select a card for inclusion with the basket and select other details.

One of the potential issues that may arise in connection with custom baskets is that the selected items for inclusion in a basket vessel may be too few or too many for the basket vessel. The system of the present invention can address these issues to ensure that a satisfactory product is provided. A number of functions may be implemented in this regard. For example, basket vessels may come in a number of sizes. Once a sender selects a basket vessel or theme, a set of appropriate baskets of different sizes may be identified. If too few items have been selected for the smallest appropriate vessel or too many items have been selected for the largest appropriate vessel, the sender may be notified, if the sender has selected a specific basket vessel that is available only in a particular size, the same comparison may be performed.

Figure 3:
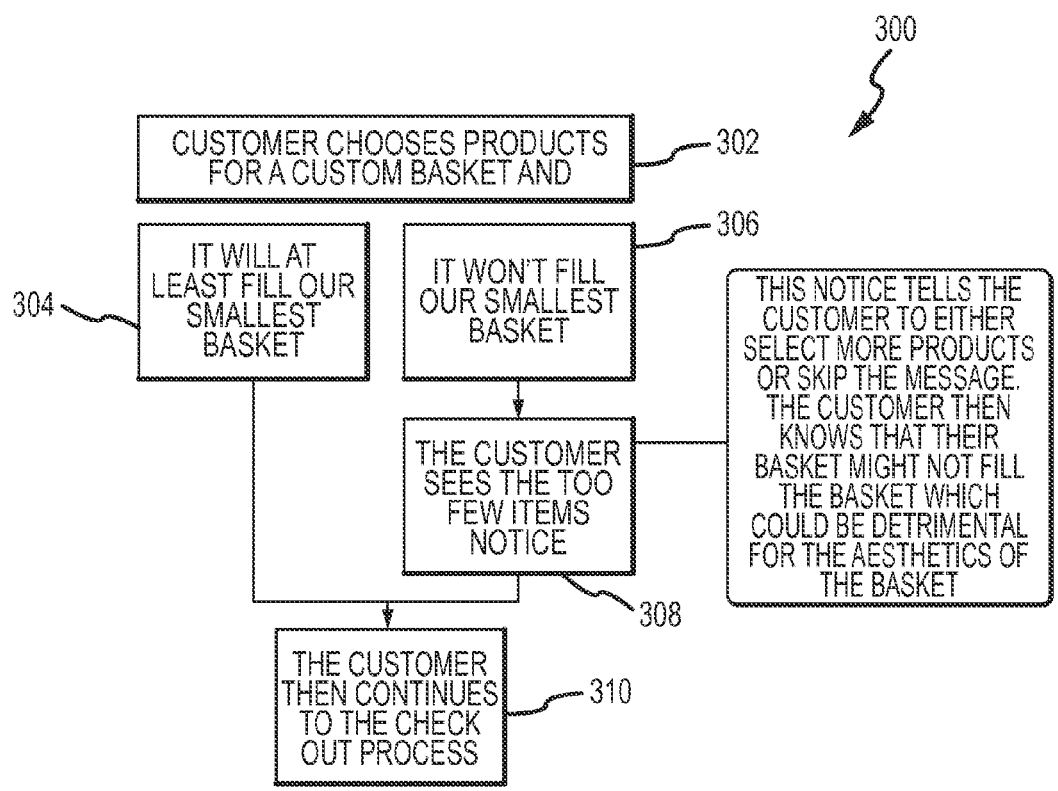
FIG. 3 is a flow chart for a "too few items" notification process in accordance with the present invention.

FIG. 3 shows an example of a process 300 for identifying situations were too few items have been selected for a basket vessel. As shown, the process 300 is initiated when the sender chooses (302) products for a custom basket. Thus, for example, the too few items analysis may be executed once the sender has finalized his selections, e.g., has advanced to the checkout process. A variety of different kinds of algorithms may be implemented for making this determination. In one implementation, this determination is based on price. That is, if a sender selects items having a cumulative price below a given threshold, from experience, the system can notify the sender that the items selected are likely too few to satisfactorily fill the selected vessel (or smallest, appropriate vessel). In another implementation, a computer stores dimensions for every item that may be selected at the website. A simple analysis may be completed by adding the dimensions of all of the selected items and comparing them to a threshold for a basket or set of baskets. The threshold may be determined theoretically or empirically. Alternatively, more complicated algorithms may be implemented relating to possible packing configurations in relation to a spatial envelope of the basket.

In any case, once this comparison has been executed, a determination is made that the items either will at least fill the smallest appropriate basket (304) or will not fill the smallest basket (306). If the items will not fill the smallest appropriate basket, a too few items notice (308) is displayed to the sender. In response to this notice, the sender may be given an opportunity select more items, select different items, select a different basket vessel, etc. in order to achieve a better fit. Alternatively, the sender may be given the option to ignore the too few items notice and proceed through the checkout process. Thus, the selected items will at least fill the smallest appropriate basket, or if the sender otherwise elects to proceed, the sender can proceed through the checkout process (310).

Figure 4:
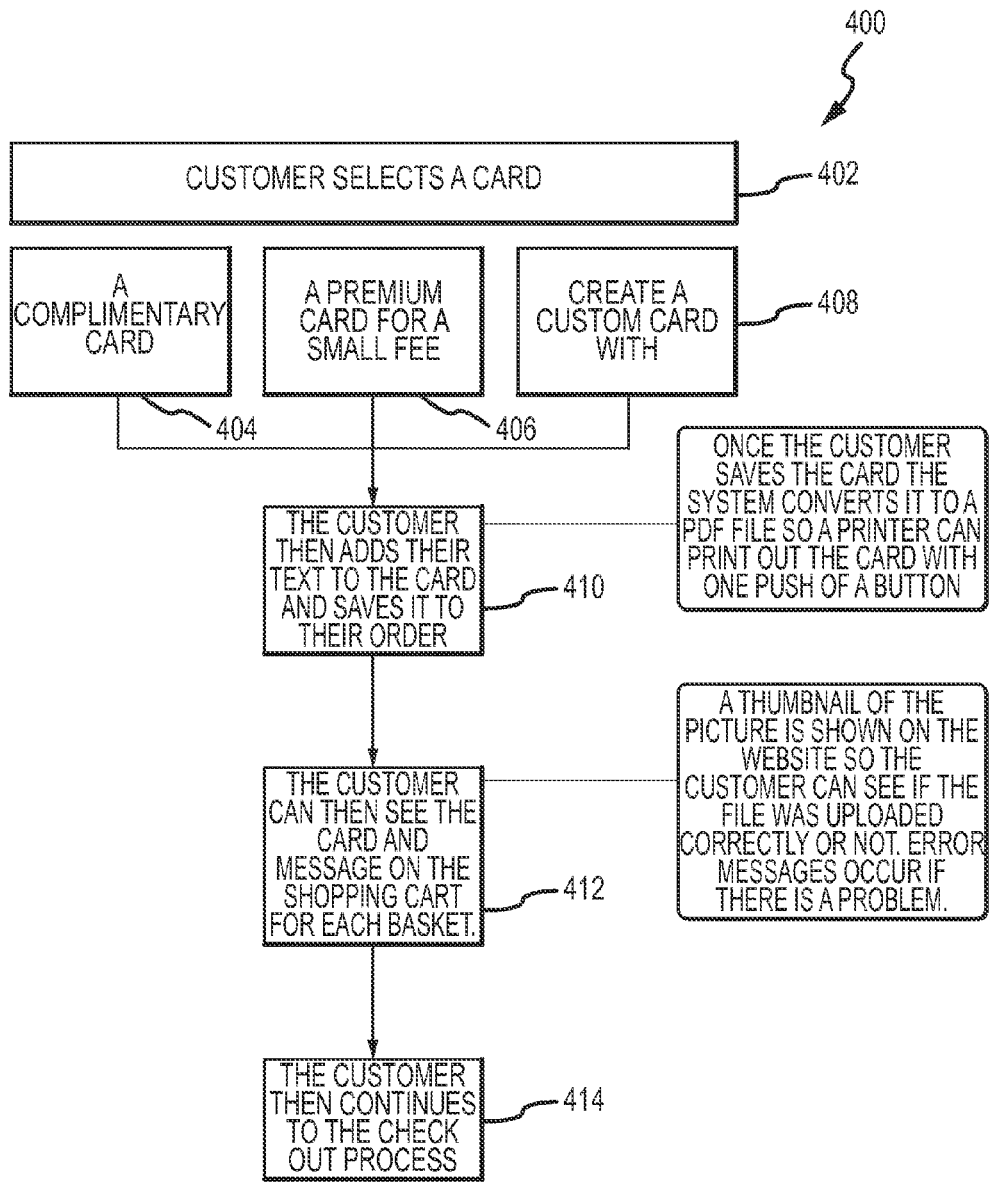
FIG. 4 is a flow chart for a card creator process in accordance with the present invention.

As noted above, the process of the present invention may also allow the sender an opportunity to select a gift card or create a custom gift card. An associated process 400 is illustrated in FIG. 4. During the checkout process, the sender is given the option of including a gift card with the basket. In the illustrated implementation, the sender is then prompted to select (402) a card. The card options in the illustrated implementation include a complimentary card (404), a premium card (406) and creating a custom card (408). The complimentary cards (404) may include cards appropriate for a variety of occasions, including various holidays, sympathy cards, birthday cards, anniversary cards, etc. The premium card option (406) may allow senders to select a premium card for a small fee. Finally, the create-a-card option (408) provides the option of allowing the sender to create a card with custom graphics and/or other uploaded content. In this regard, the sender can upload images in any supported format such as PDF, TIF, etc.

In any of these cases, the sender may include text entered into an appropriate text box. In this regard, senders may add (410) text to the card and save it to their orders. At this point, the system converts the card, in the illustrated implementation, to a PDF file, and a printer prints the card for inclusion with the basket. A display then shows (412) the card with the message in connection with the shopping cart for each basket. The sender then continues (414) through the checkout process.

Figure 5:
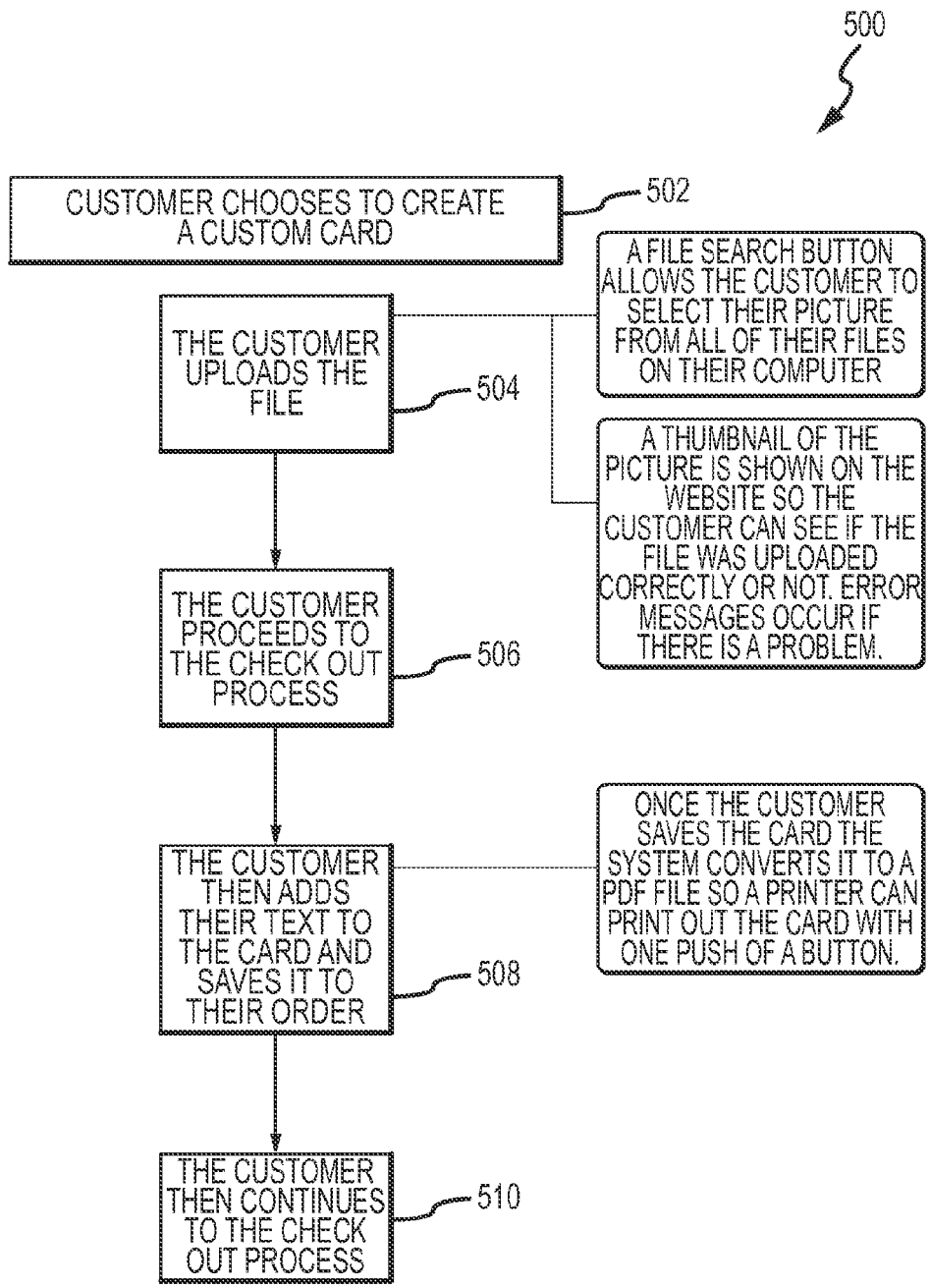
FIG. 5 is a flow chart for a photo creator upload process in accordance with the present invention.

FIG. 5 illustrates a photo upload, process 500 that may be executed in relation to creating a custom card. The process is initiated when the sender chooses (502) to create a custom card, as discussed above. The sender is then prompted to upload (504) the file in a supported format. For example, a file search button may allow senders to search their picture folders from all of their image files on their computer to select the desired picture. A thumbnail of the picture is shown on the website so the sender can see and verify that the file was uploaded correctly. An error message is presented if there is any problem in this regard. The sender then proceeds (506) to the checkout process and adds text (508) to the card. The card with the picture and the text is saved to the sender's order. The sender then continues to the checkout process (510).

Figure 6:
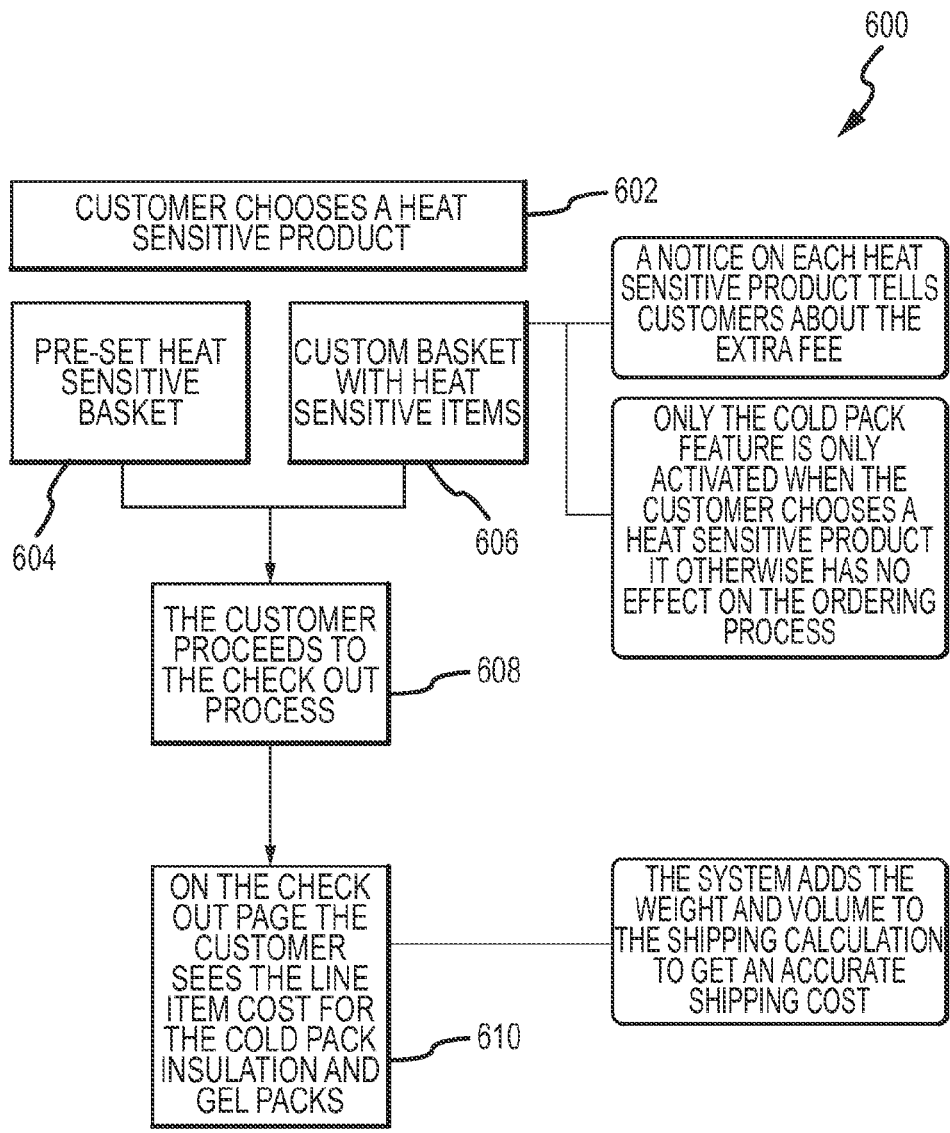
FIG. 6 is a flow chart for a cold pack shipping calculation process in accordance with the present invention.

In some cases, the items for inclusion in the basket may include perishable items or items that require cold packing. FIG. 6 illustrates a process 600 for use in handling such items. The illustrated process 600 is initiated when the sender chooses (602) a heat-sensitive product, such as certain food items. Each of these hems may be associated with an identifier in an appropriate database to identify the product as heat-sensitive so that appropriate processing can be triggered when a sender selects the item. This may occur in connection with a predetermined basket (604) that includes heat-sensitive items or in connection with a custom basket (606) when the sender selects a heat-sensitive item. In the latter regard, a notice may be displayed in connection with each heat-sensitive product to inform the sender about extra fees associated with heat-sensitive products. When a sender selects a heat-sensitive item, the processing continues as normal with the exception of triggering the heat-sensitive process. Accordingly, the sender proceeds (608) to the checkout process. On the checkout page, the cost associated with the cold pack insulation and gel packs is displayed (610) to the sender. In this regard, the system adds the weight and volume to the shipping calculation to arrive at the additional cost. In addition to the extra cost associated with the additional size and weight, there may be an additional charge for processing of perishables.

Figure 7:
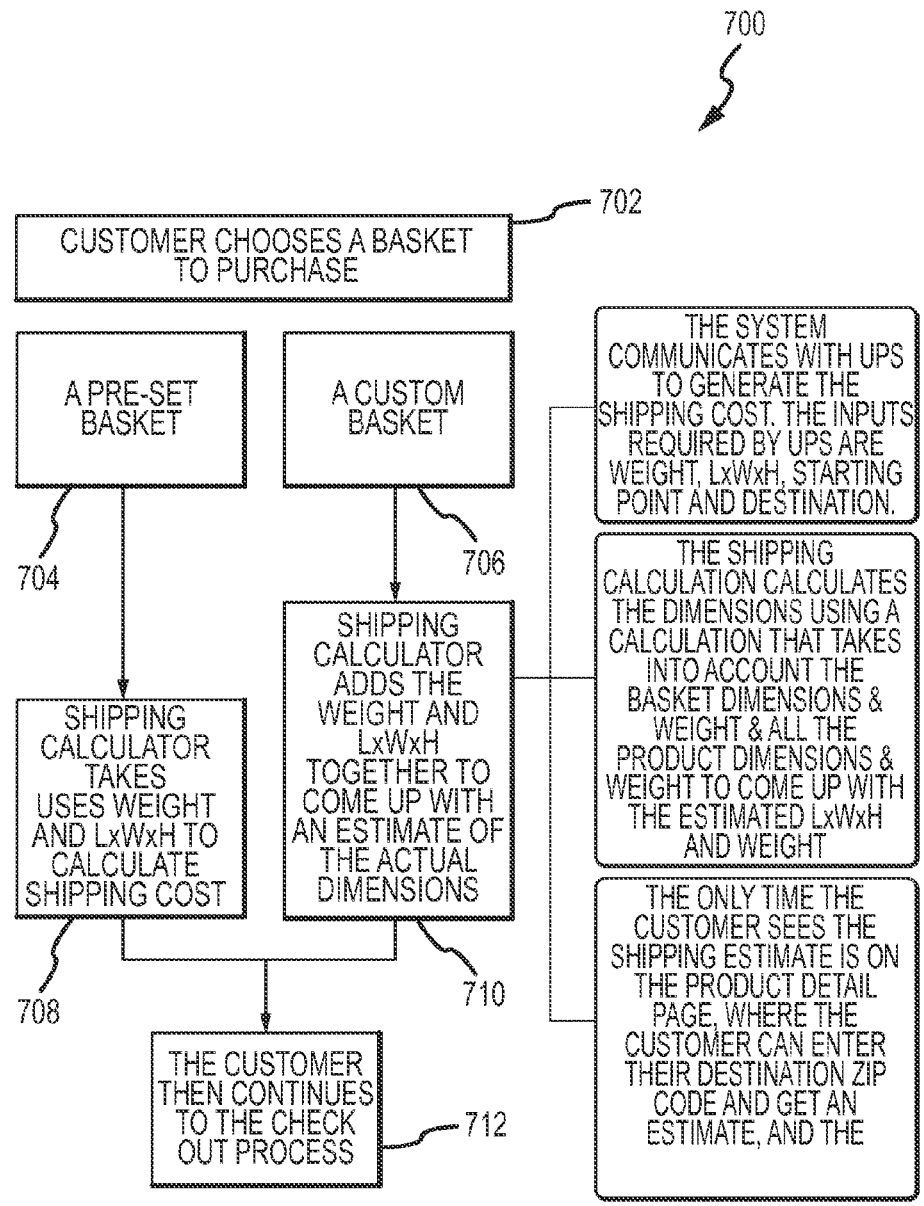
FIG. 7 is a flow chart for a shipping calculator process in accordance with the present invention.

The various shipping costs, as discussed above, are determined by a shipping calculator. An associated process (700) is shown in FIG. 7. The shipping calculation is executed when the sender chooses (702) a basket to purchase. In the case of a preset basket (704), the shipping calculator uses (708) the weight and the known package dimensions to calculate shipping costs or simply looks up appropriate costs. When the weight and exact dimensions are known, the costs can typically be calculated based on shipping costs, charts or logic available from individual shippers. The sender can then continue (712) to the checkout process where the shipping costs are shown.

In the case of a custom basket (706), the shipping calculator adds the weight and the dimensions for specific items to come up with an estimate of the cumulative basket weight and dimensions (710). As discussed above, a variety of algorithms can be implemented in this regard. A simple algorithm may add the dimensions of each item and use the resulting value or values to estimate the size of the ultimate package. The overall weight and dimensions can then be used, as noted above, to determine a shipping cost based on information from various shippers. The sender then continues (712) to the checkout process where the shipping cost is reflected, it should be noted that the shipping calculator also receives information regarding cold pack costs that can be factored into the ultimate shipping cost. This information may include a flat fee, as well as dimensions and weight related to cold packing.

Figure 8:
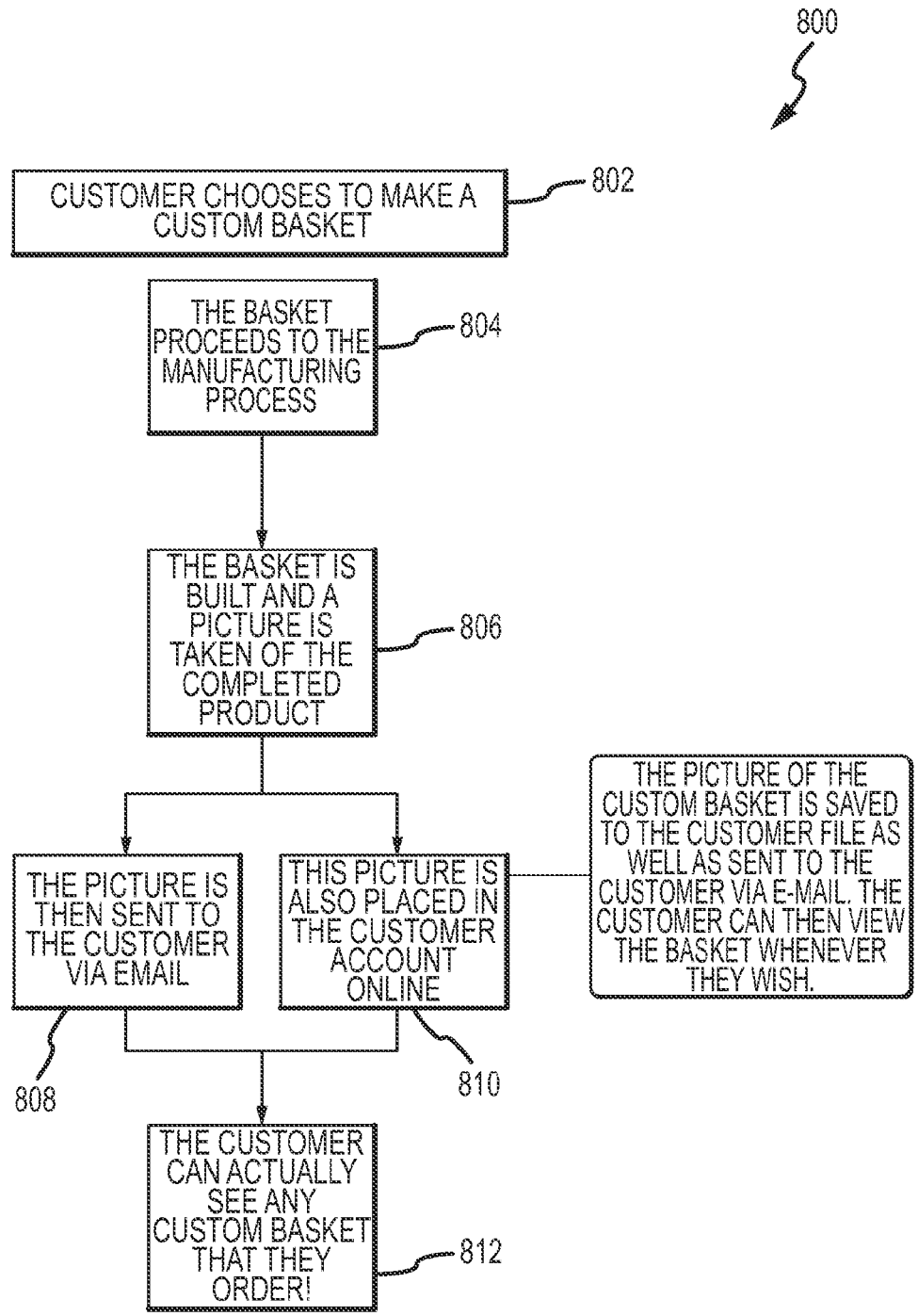
FIG. 8 is a flow chart of a custom basket viewer process in accordance with the present invention.

One issue that may discourage senders from building a custom basket is that they never get to see an image of the finished product. The present invention addresses this potential issue by providing images of the completed basket to the sender. An associated process is illustrated in FIG. 8. The illustrated process 800 is initiated when the sender chooses (802) to make a custom basket. The basket then proceeds (804) through the manufacturing process, as described above. At the conclusion of the construction process, a picture is taken (806) of the completed product. If an email address is available for the sender, the picture is then sent to the sender (808) via email. The picture is also placed (810) into, the sender account online. The sender can then view the picture by accessing the file online, in either case, the sender can then view (812) any custom basket that they order.

Figure 9:
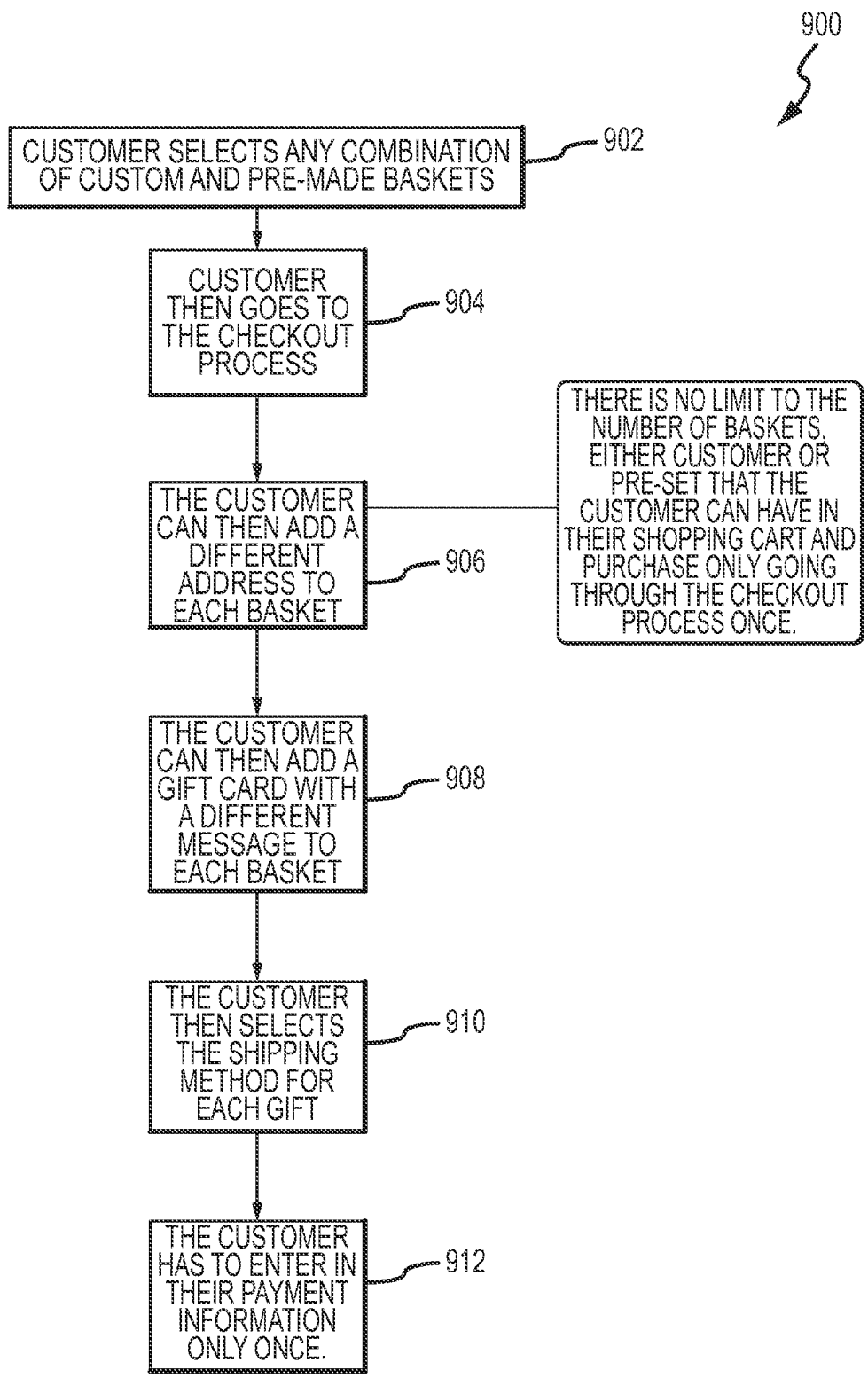
FIG. 9 is a flow chart of a multiple shipping process in accordance with the present invention.

The present invention also allows a sender to send multiple baskets to multiple recipients. For example, a professional may desire to sent baskets to multiple clients in connection with a holiday. Similarly, an individual may wish to send baskets to multiple friends and/or family members. FIG. 9 illustrates an associated process 900. The sender first selects (902) a combination of senders and pre-made baskets. The sender then goes (904) to the checkout process where the sender can add (906) a different address to each basket. In addition, the sender can add (908) a gift card with a different message to each basket and select the shipping method (910) for each gift. It will be appreciated that different shipping methods may be used for different gift baskets. Conveniently, the single checkout process for multiple baskets for multiple recipients allows the sender to enter (912) their payment information only once.

Much of the discussion above has assumed that the website is accessed by an individual sender. However, the system of the present invention provides advantages that may be useful to affiliates. For example, real estate or other professionals may send baskets on a regular basis to their customers or clients. In such cases, the affiliate may desire to include branded items in the basket. The associated process can work much as described above but with additional options of branded items that are available only to authorized senders. In other cases, businesses that wish to market baskets of their own merchandise and may wish to use the system of the present invention as a kind of fulfillment center. In that case, it may be desirable to enable affiliate senders to enter orders without ever noticeably leaving the affiliate website. Functionality related to such situations is described below.

Figure 10:
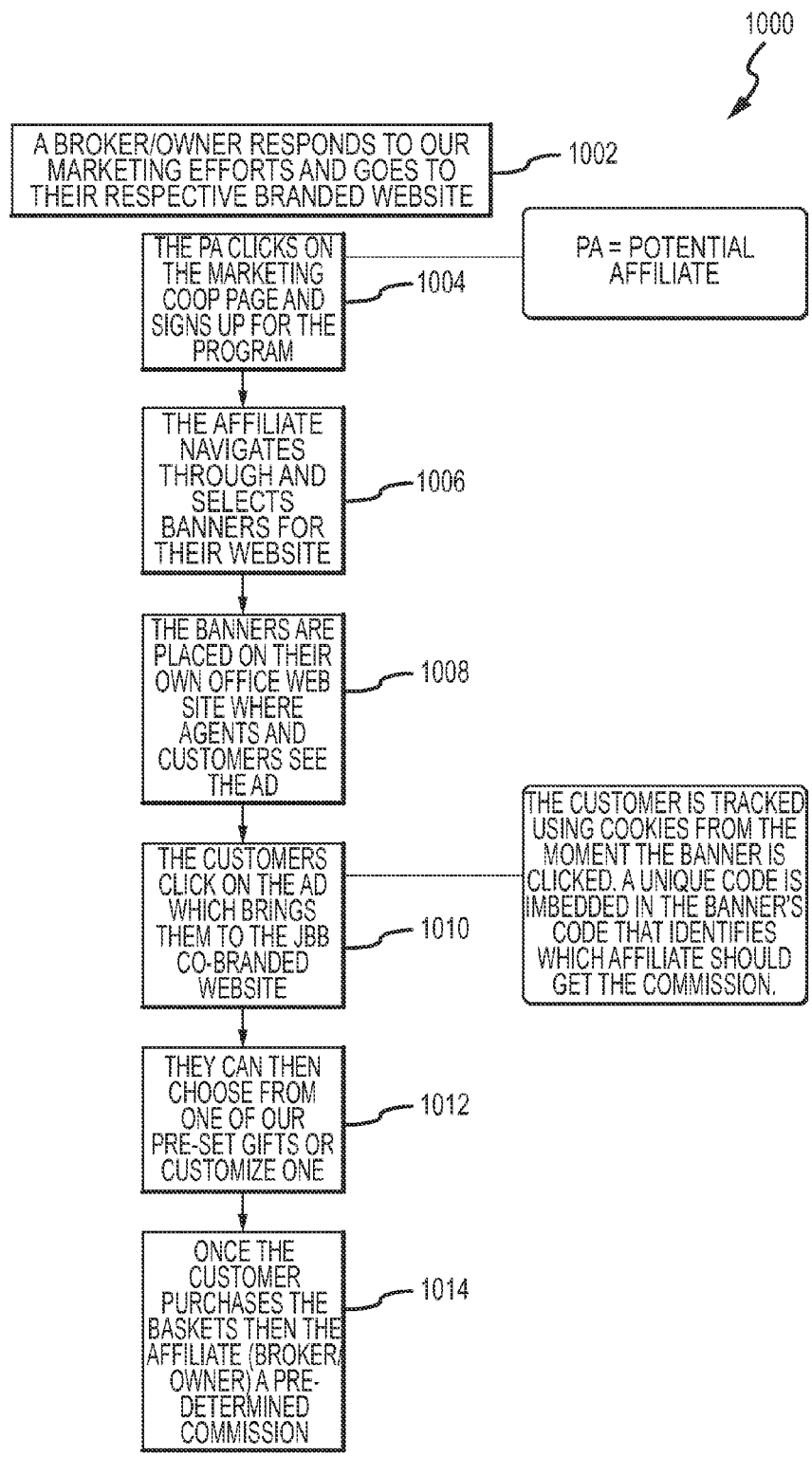
FIG. 10 is a flow chart of a marketing cooperative process in accordance with the present invention.

Referring to FIG. 10, a marketing cooperative process 1000 is shown. The illustrated process 1000 is initiated when a broker/owner goes to their respective branded website (1002). It will be appreciated that branded websites may be provided for many affiliates in connection with the main basket website. The potential affiliate may then click (1004) on a marketing cooperative page to sign up for the program. At the marketing co-op page, the affiliate can then begin navigating through options to select (1006) banners for their website. The banners are then place (1008) on their own office website where agents and senders see the ad.

In use, the sender clicks (1010) on the ad, which brings them to the co-branded website. The sender may be tracked using cookies from the moment the banner is clicked. A unique code is embedded in the banner's code that identifies which affiliate should get the commission associated with any resulting sales. The sender can then choose (1012) a predetermined gift basket or generate a customized basket as described above. When the sender purchases (1014) a basket, the affiliate receives a predetermined commission.

Figure 11:
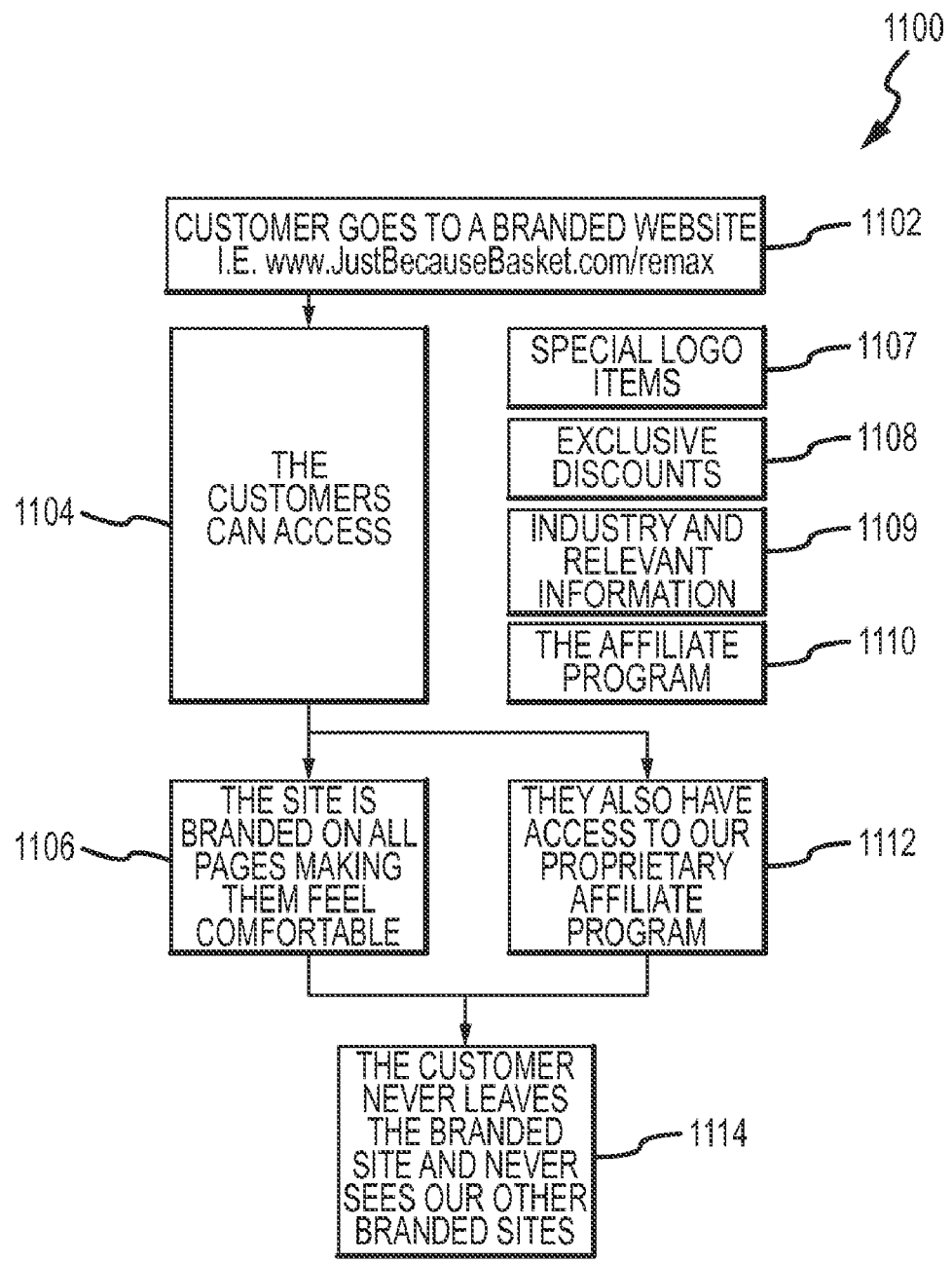
FIG. 11 is a flow chart of a branded website process in accordance with the present invention.

FIG. 11 illustrates a branded website process 1100. The process is initiated when the sender goes (1102) to a branded website. The branded website may be accessed through a main web page of the basket site or may be accessed from an affiliate's website, as discussed in more detail below. From the site, the senders can access (1104) a variety of items that are specific to the branded website, including special logo items (1107), exclusive discounts (1108), industry and relevant information (1109) and the affiliate program (1110). The site is branded (1106) on all pages so that the senders feel comfortable. However, the senders have access to (1112) the proprietary affiliate program. In this regard, the sender never leaves (1114) the branded site and never sees other branded sites.

The custom basket functionality described above can also be provided directly, from the perspective of the sender, from the affiliate's website. In this regard, a template can be provided to the affiliate for use in connection with its website. The template collects all of the information needed to construct a custom basket as described above. The information from the template can then be forwarded to a processing system of the basket assembly facility (as described above), which functions, in this case, as a fulfillment center. In this regard, the template can be constructed and linked to the facility processing system such that the information from the template can be processed in the same manner as information entered at the basket system website in the examples described above. In this manner, the affiliate can utilize the basket construction expertise and technology associated with the basket processing system while, optionally, the sender always remains within the affiliate's site. The affiliate transmits to the basket processing system the template information. The basket processing system may transmit certain information back to the affiliate site, such as, for example, shipping costs. In addition, the affiliate can transmit order verification and payment information to the basket processing system. Alternatively, the basket processing system functionality can be licensed to the affiliate and executed on platforms associated with the affiliate site.

Figure 12:
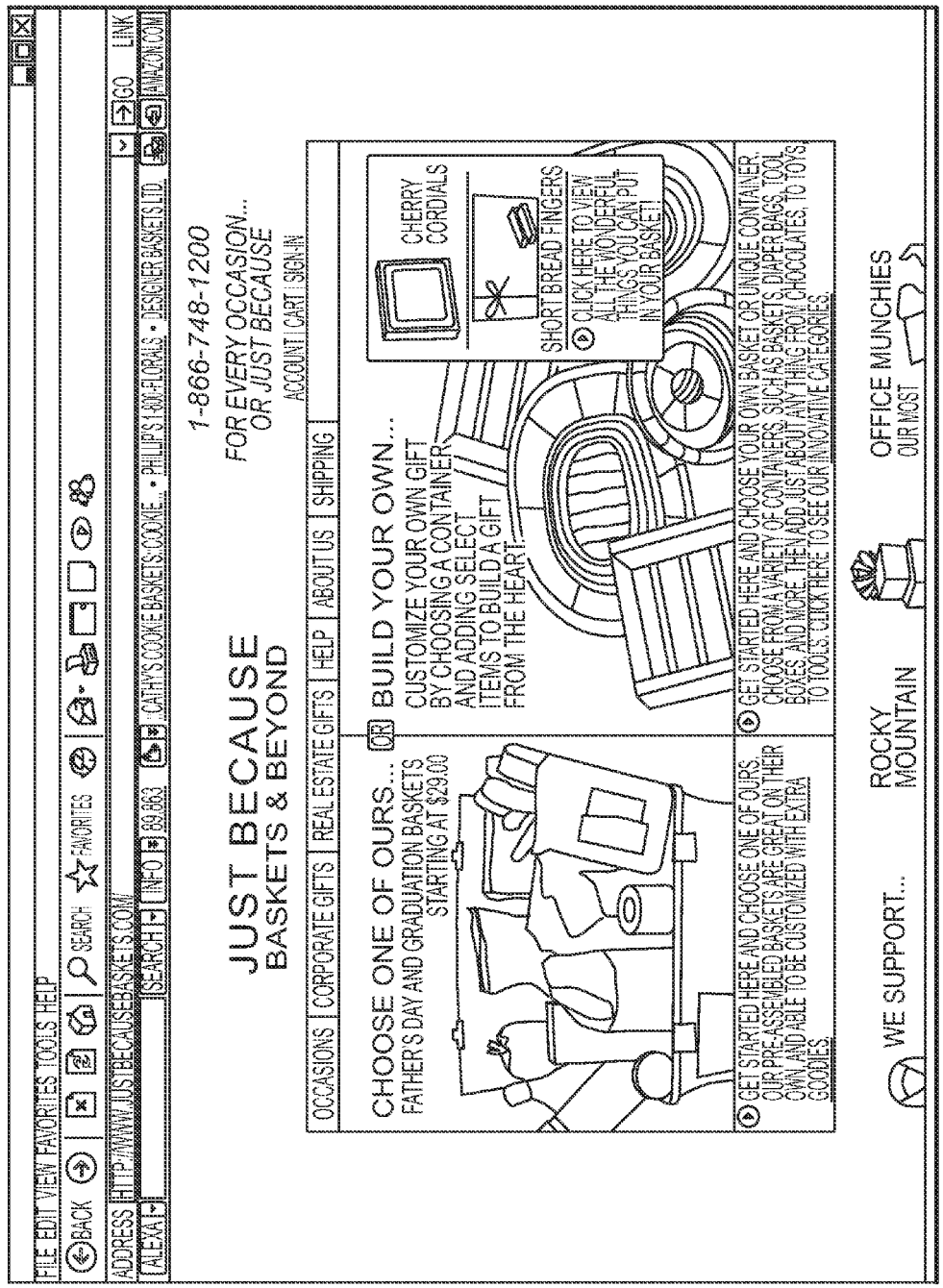

The above-noted functionality and certain additional functionality can be summarized by reference to screenshots, as shown in FIGS. 12-31. FIG. 12 is a screenshot showing a homepage of a basket system website, in this case, having a URL, of www.justbecausebaskets.com. As shown, from the homepage, the sender can select to choose a predefined or pre-assembled basket or to build his own basket. The homepage also includes options to construct baskets for specific occasions, to select corporate gifts or real estate gifts. The sender can also select to place an order by telephone.

Figure 13:
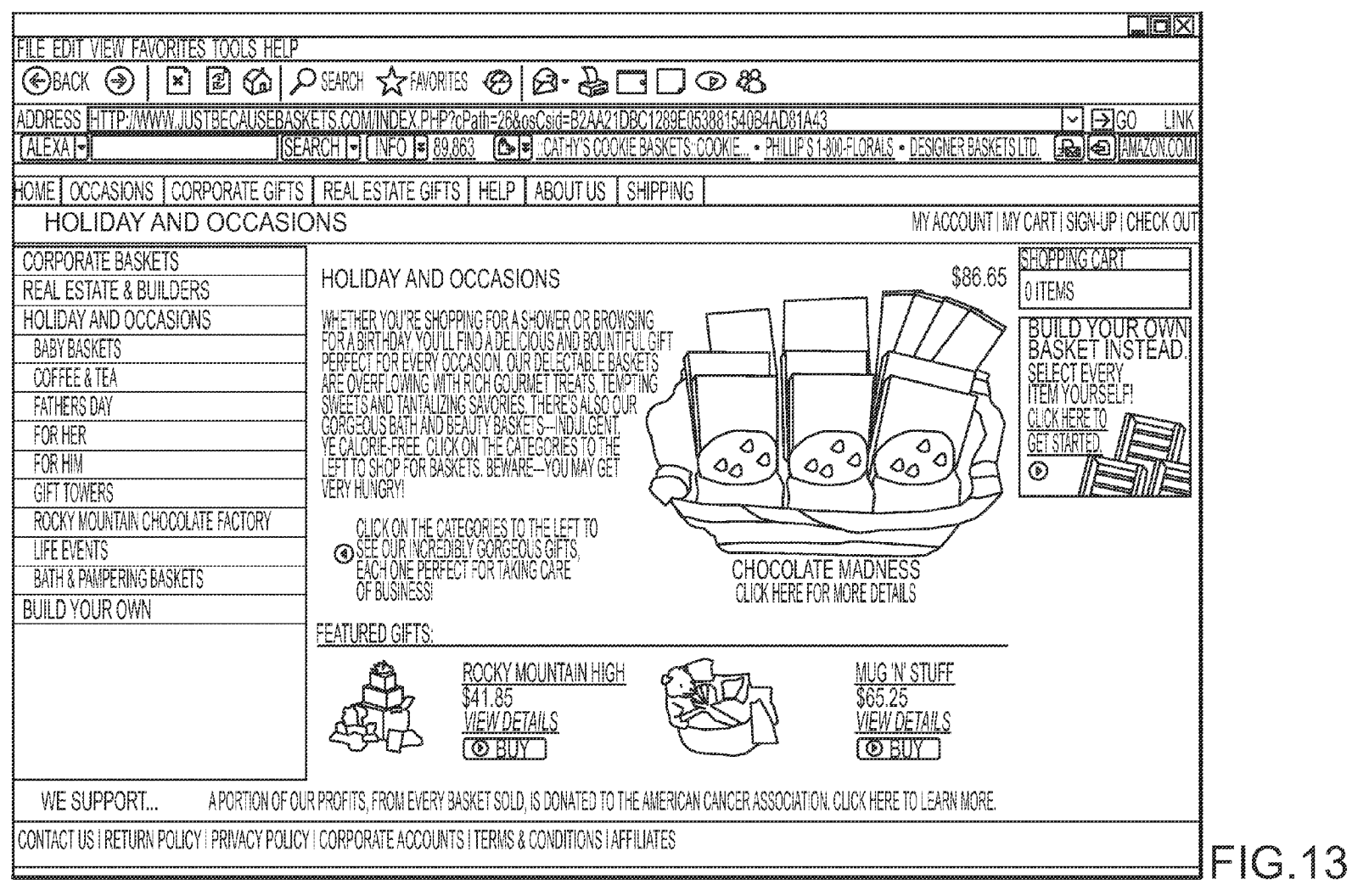

If the sender selects the "occasions" tab, he will be linked to a page as shown in FIG. 13. From this page, the sender can access gift ideas for a variety of occasions. This page may also include certain featured pre-assembled baskets. The sender can also link to a page for building his own basket if desired.

Figure 14:
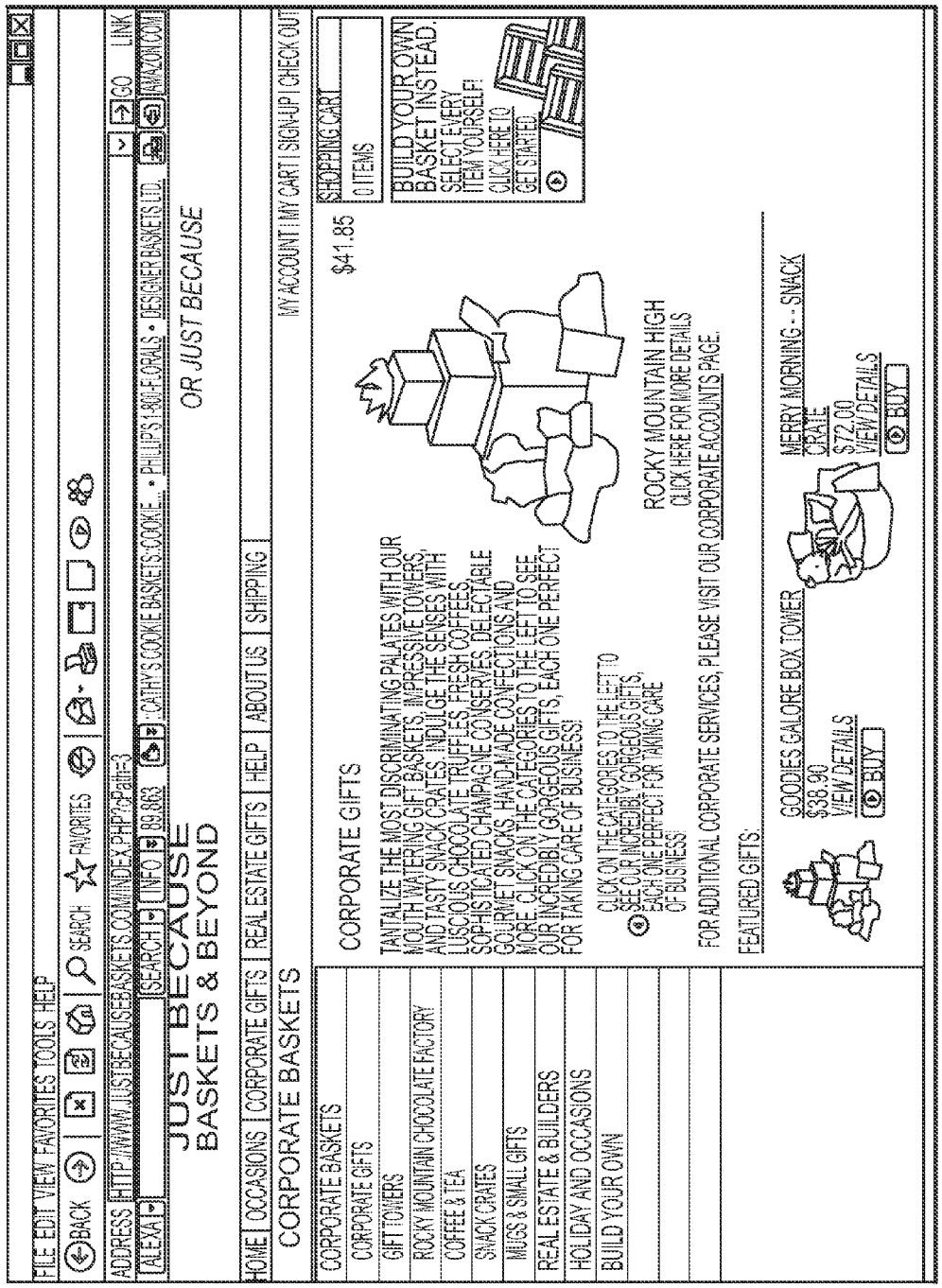
Figure 15:
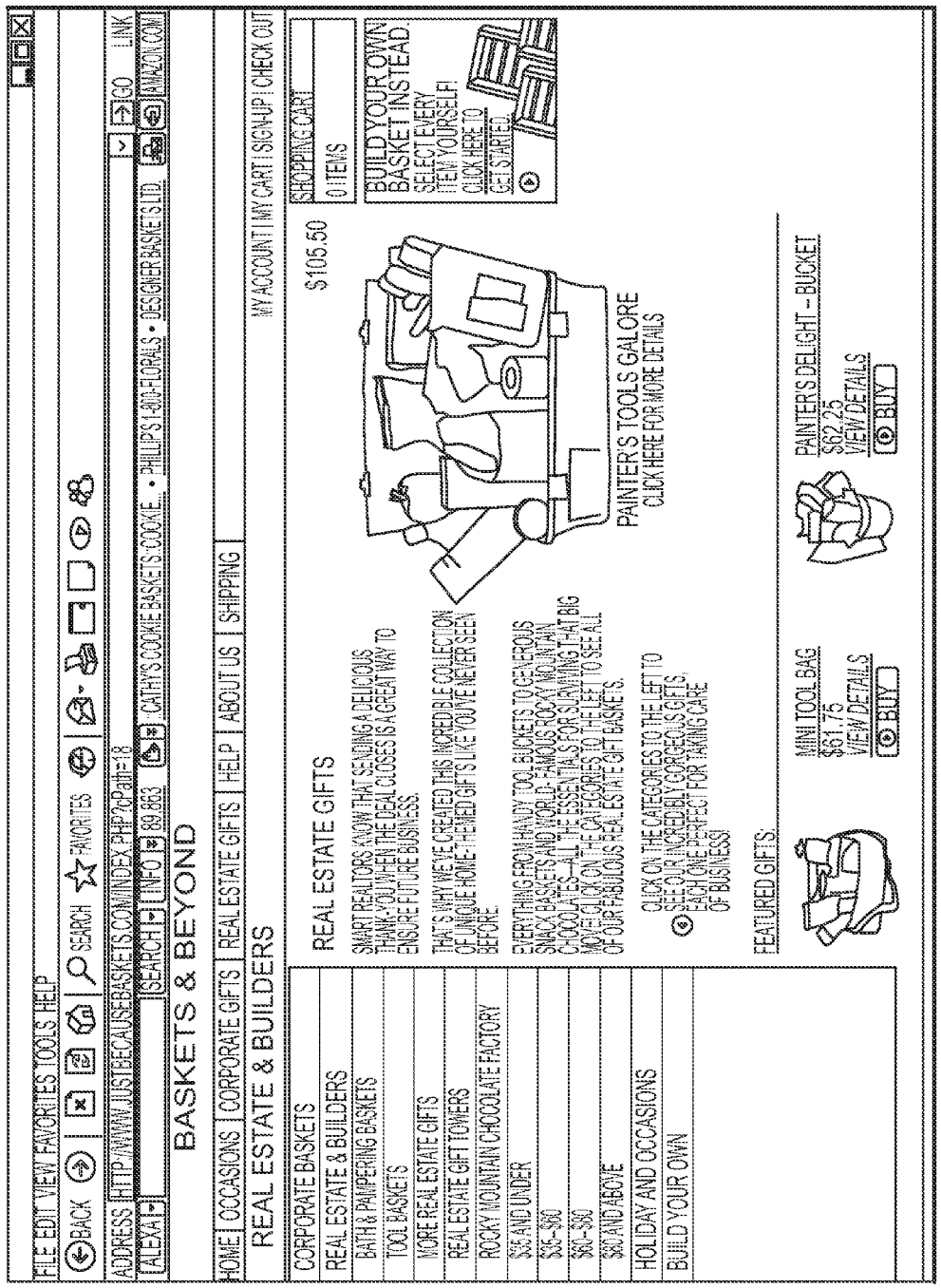

From the homepage, if the sender selects the "corporate gifts" tab, a page such as shown in FIG. 14 may be displayed. This page provides a variety of links to different types of corporate gifts and may also include a featured corporate gift. FIG. 15 shows a screenshot for real estate gifts. Again, the sender can link to various real estate gift ideas, and there may be a featured real estate gift shown.

Figure 16:
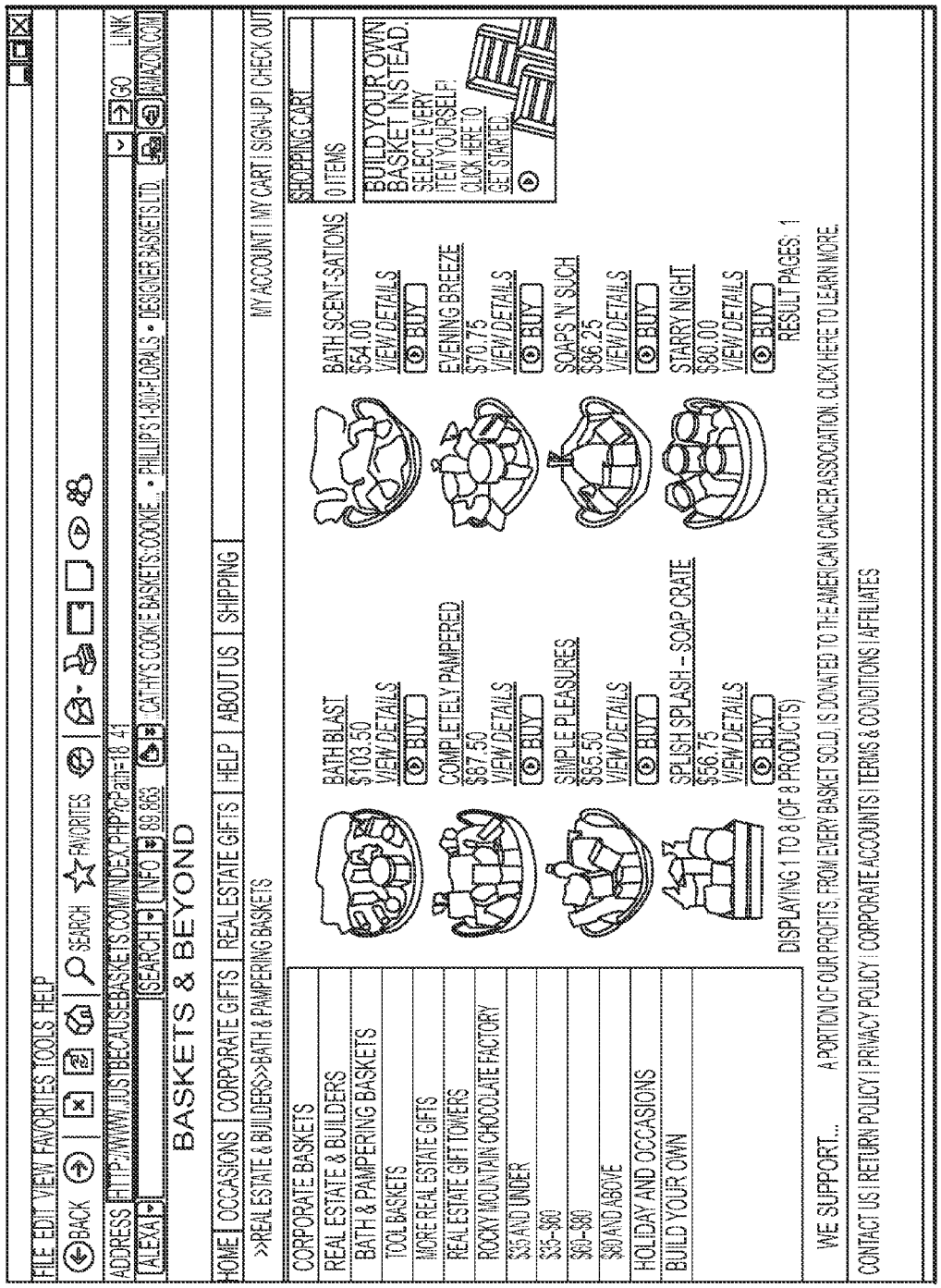
Figure 17:
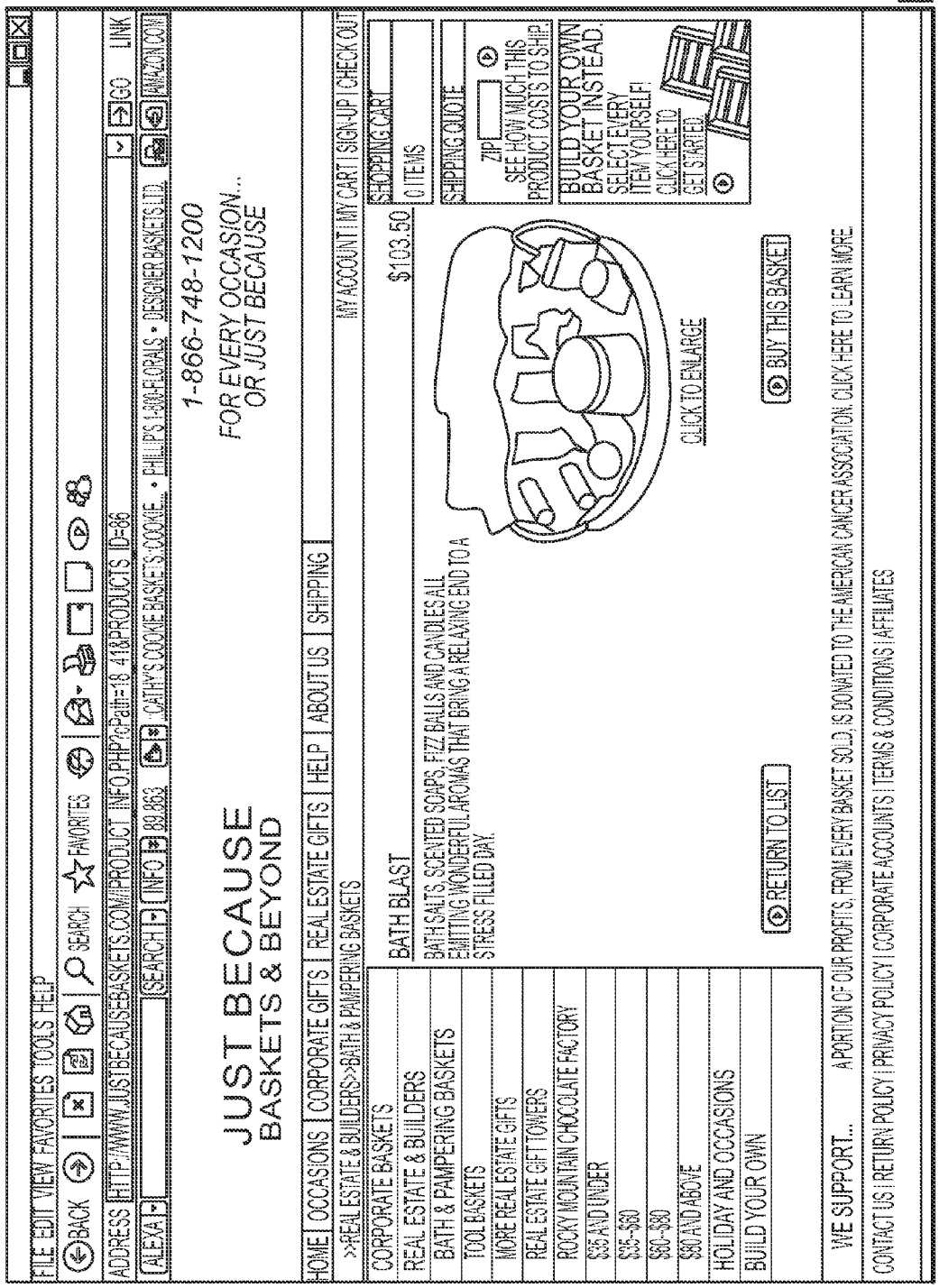
Figure 18:
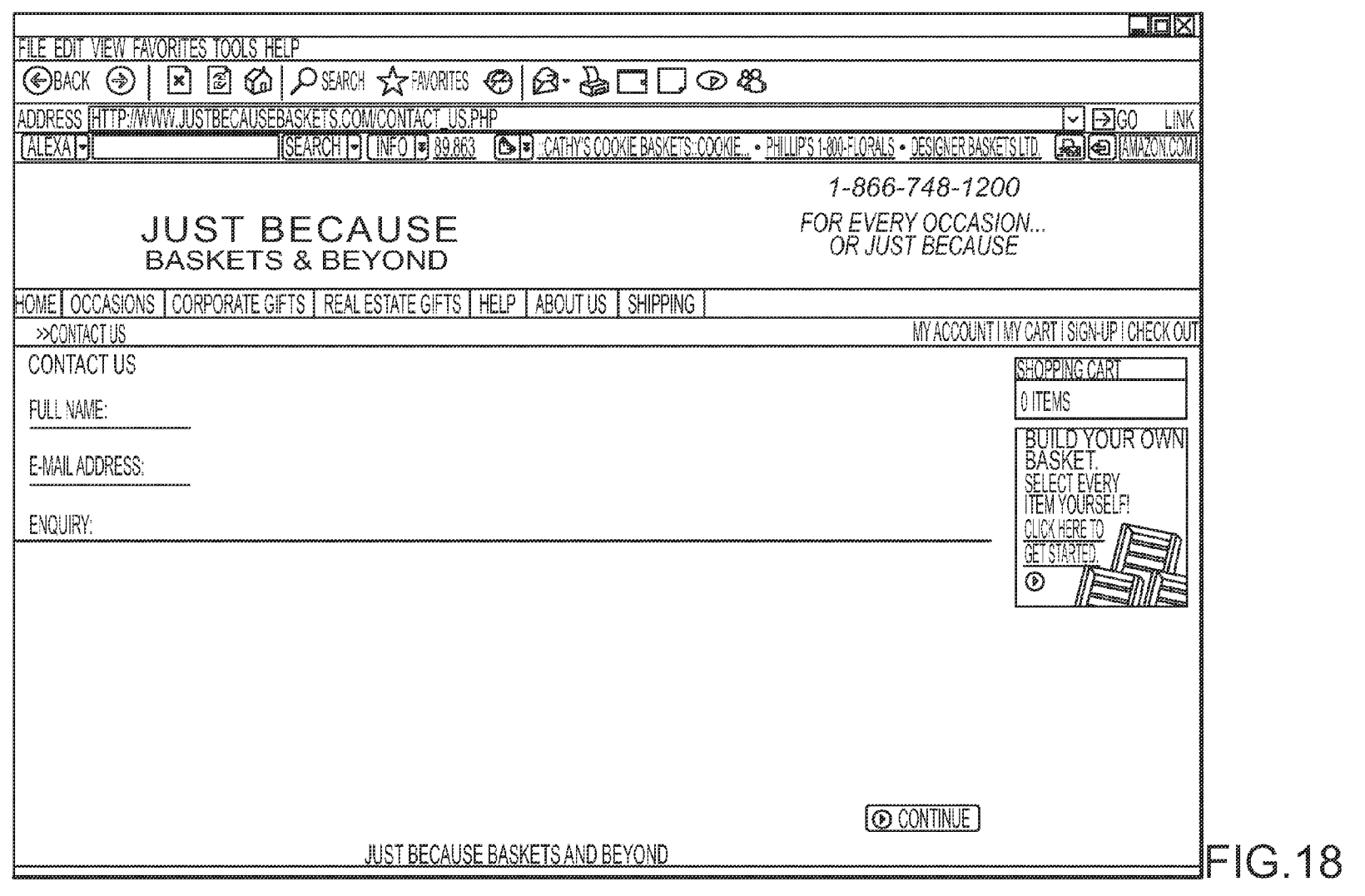

FIG. 16 shows a selection of predefined gift baskets that may be conveniently selected by senders. Alternatively, the senders may elect to build their own baskets instead. From the display of predefined baskets, the sender may click on any of the baskets to get more details, as shown in FIG. 17. The sender may also select a "contact us" link to submit any relevant inquiry via a page as shown in FIG. 18.

Figure 19:
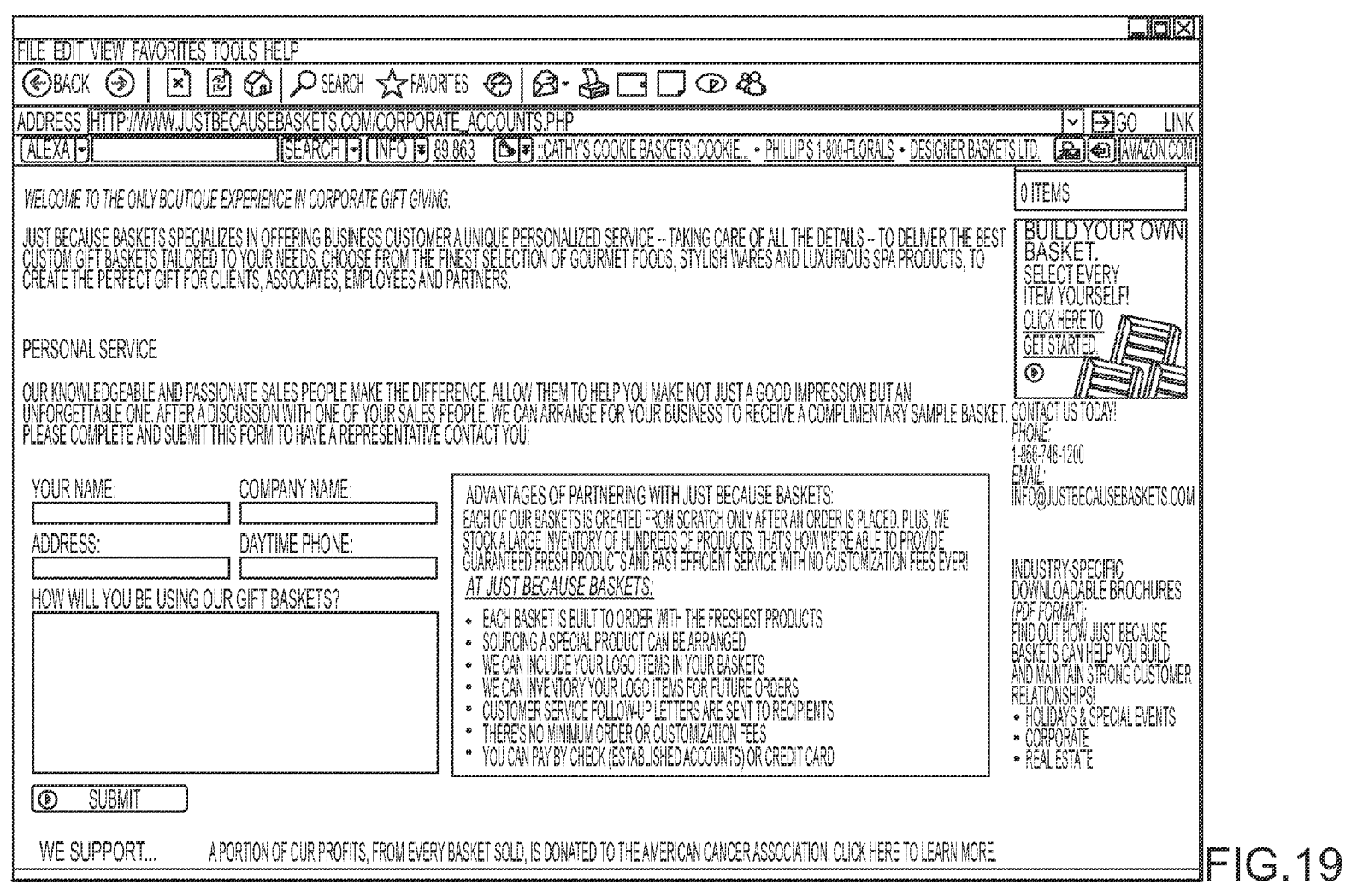
Figure 20:
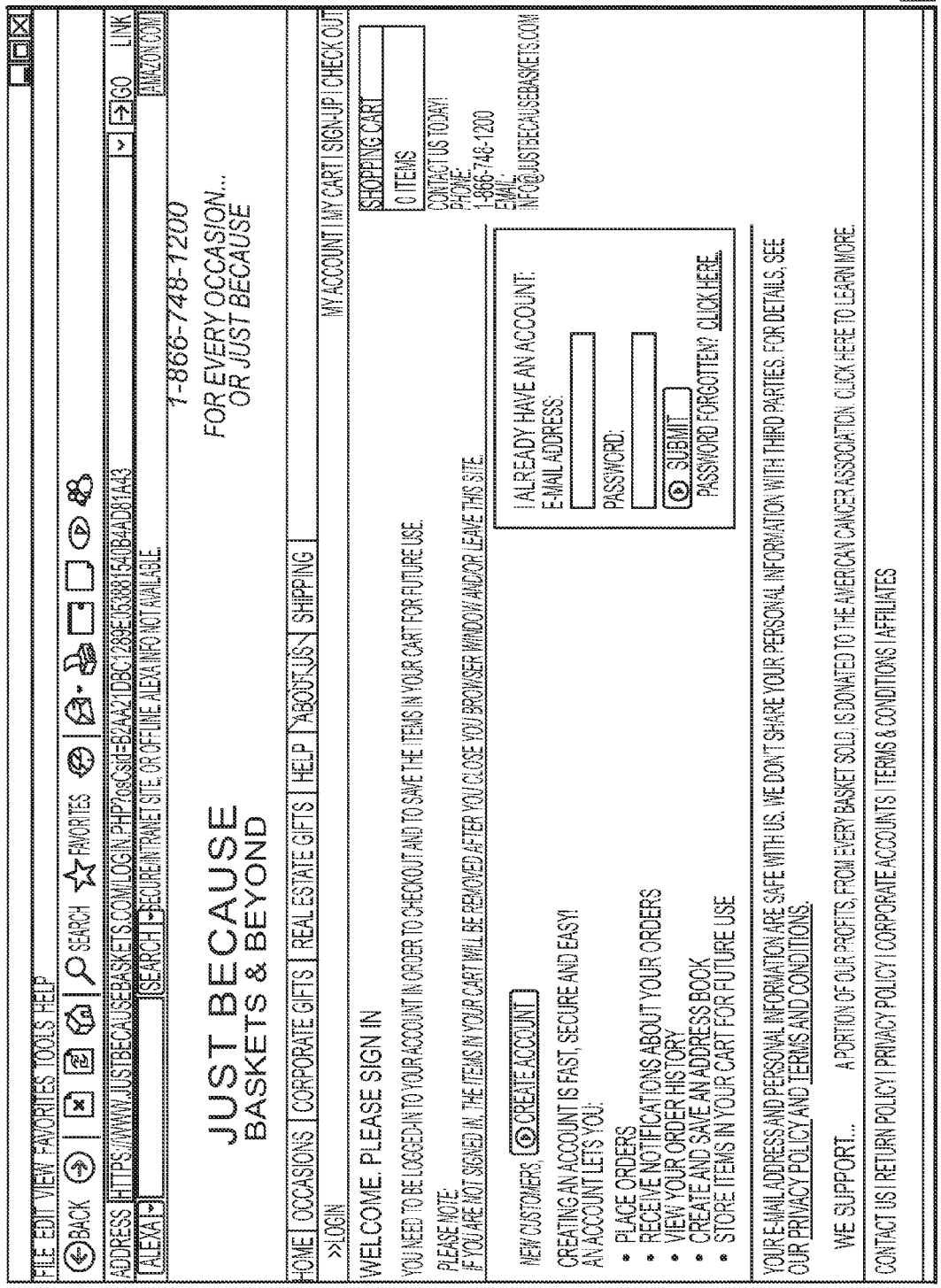

A corporation may choose to open a corporate account to facilitate periodic gifts to clients or business partners. FIG. 19 shows a screen for use in signing up for such a corporate account. Once the account has been created, authorized personnel may access the account. FIG. 20 shows a dialogue box that may be used in securely accessing an established corporate account.

Figure 21:
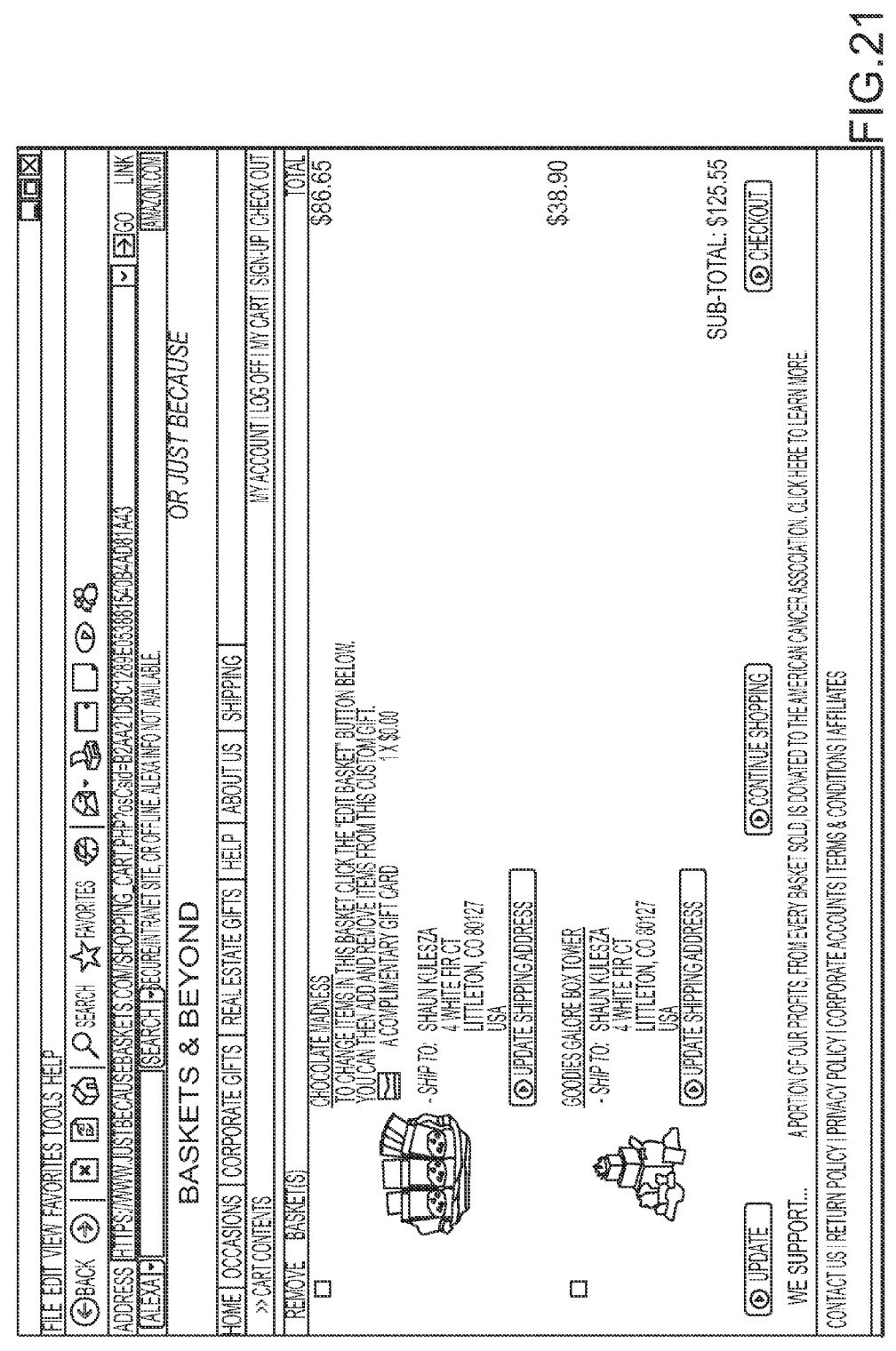

In any case, a sender may then navigate the site to select or build baskets. As noted above, multiple baskets may be purchased by single checkout process and may be sent to different recipients. FIG. 21 shows a shopping cart page in this regard. The shopping cart page shows the baskets that have been selected, as well as the shipping address and recipient for each basket. Also, a running total of costs is shown. As can be seen in FIG. 21, it is possible to update shipping addresses on an individual basket basis or to return to continue shopping from the shopping cart page.

Figure 22B:
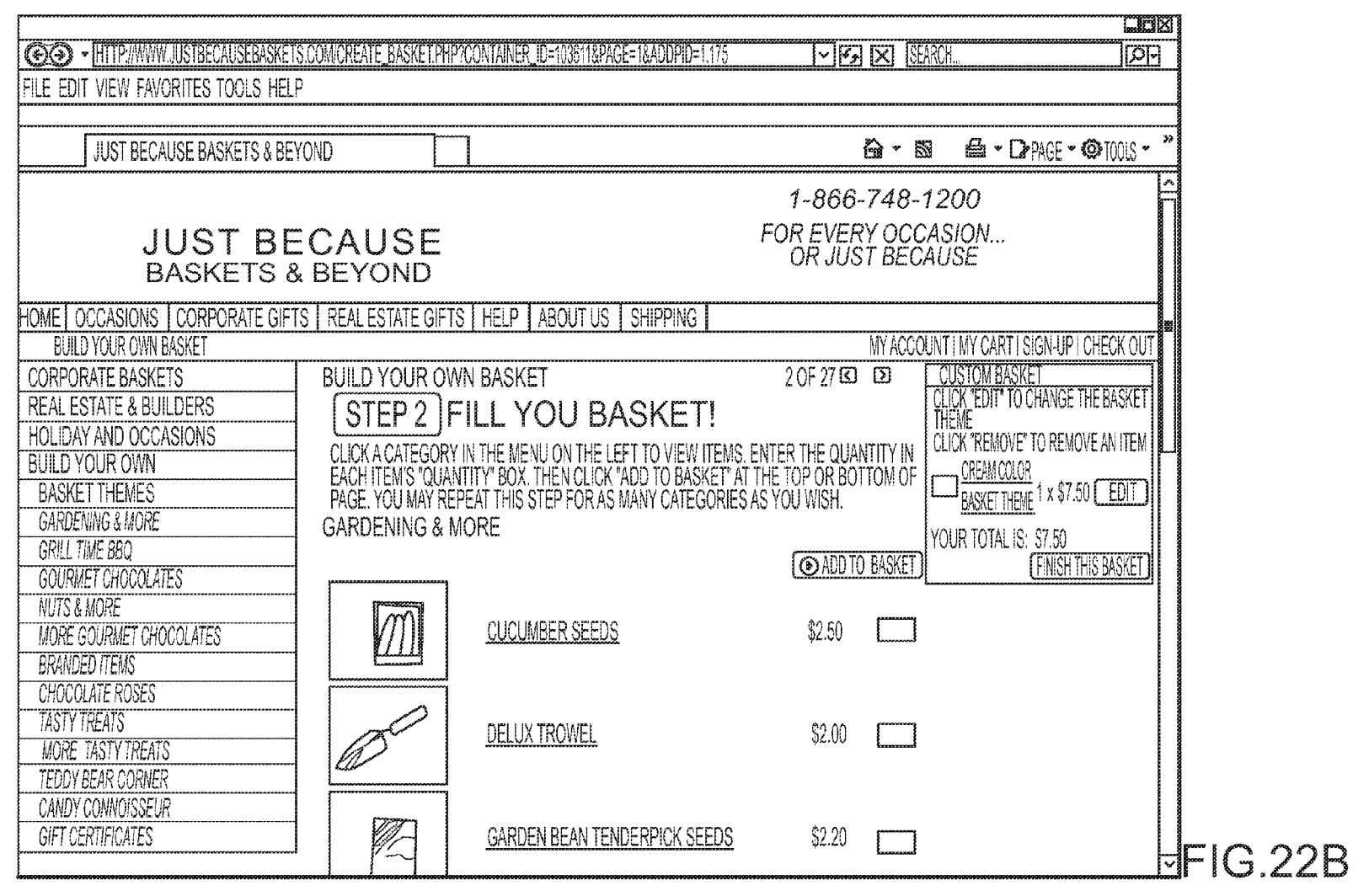
Figure 22C:
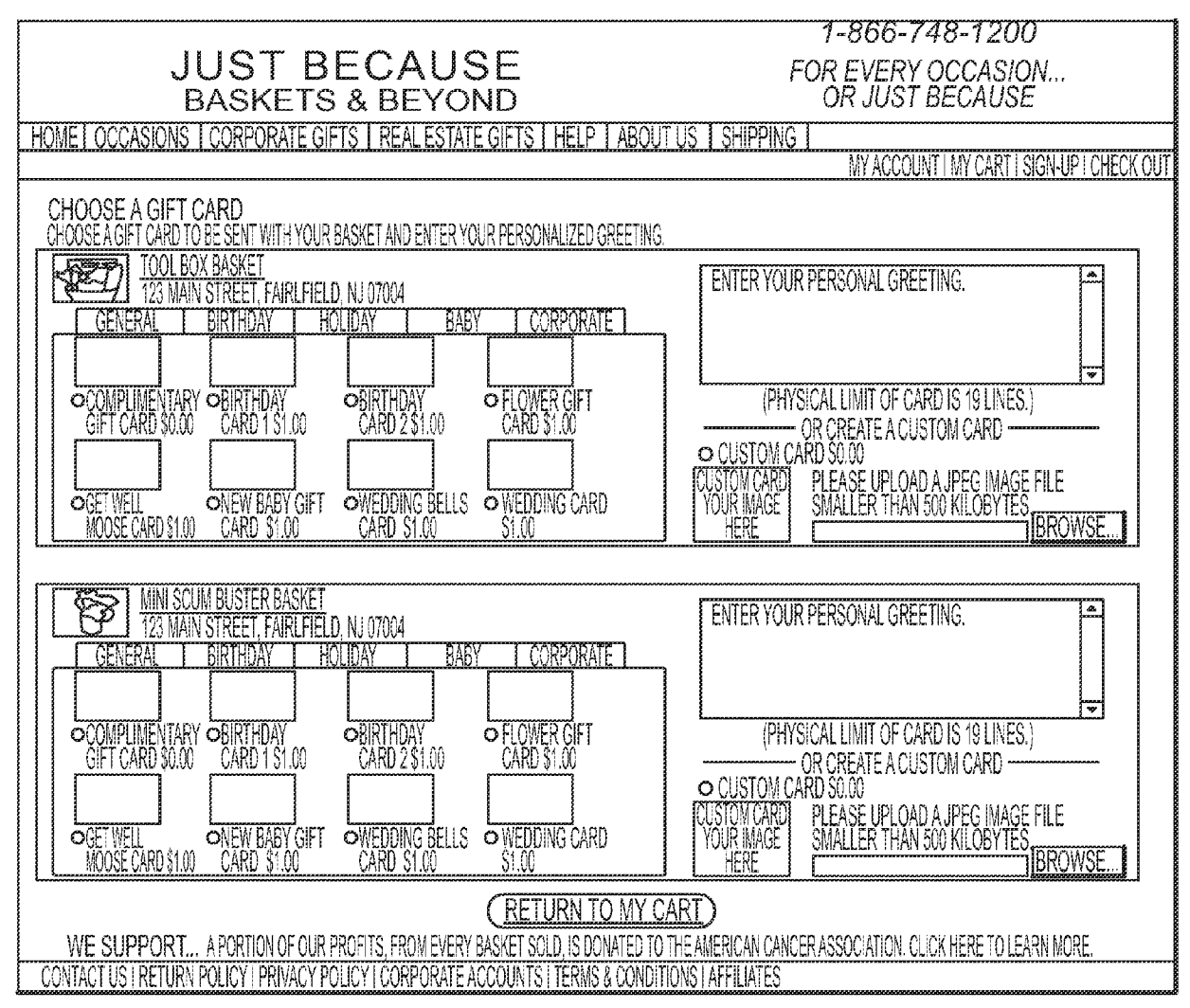

Thus, a sender may first select a vessel or basket theme from a page as shown at FIG. 22A. The sender can then select items for inclusion in the basket at a page as shown in FIG. 22B. A mini shopping cart box on this page shows a running total of items and costs for the basket and provides links to edit, remove or finish the basket as well as links to product detail pages for each of the selected items. In addition, a greeting card may be created for each basket in an order. An associated screenshot is shown in FIG. 22C. A complimentary gift card or premium gift card can be selected for each of the baskets. Dialog boxes allow for entry of a personal greeting for each card. An option is also provided here for creating a custom card with an uploaded image.

Figure 23:
Figure 24:
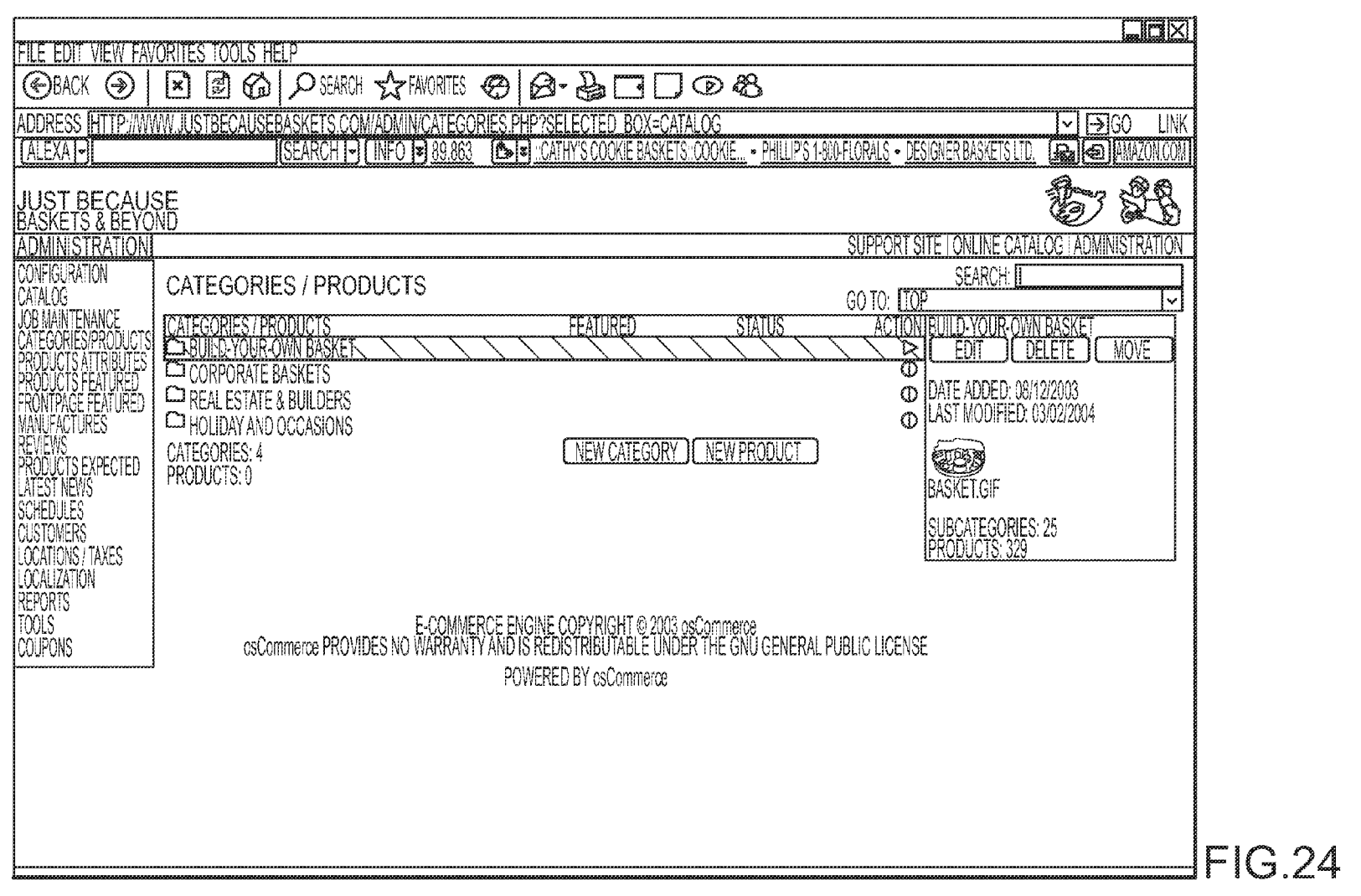

FIG. 23 shows a "delivery information" screen. On this page, the sender can confirm or change the shipping address for a box. In addition, the sender can confirm the gifts that have been ordered and select a delivery option. Appropriate costs are calculated and displayed in connection with each delivery option. Comments about the order may be provided in a panel on the screen. FIG. 24 shows a screenshot associated with selecting a basket option. In this case, customers may select to build their own baskets, to select corporate baskets, to select real estate or builder baskets or to select a basket for a holiday or other occasion.

Figure 25:
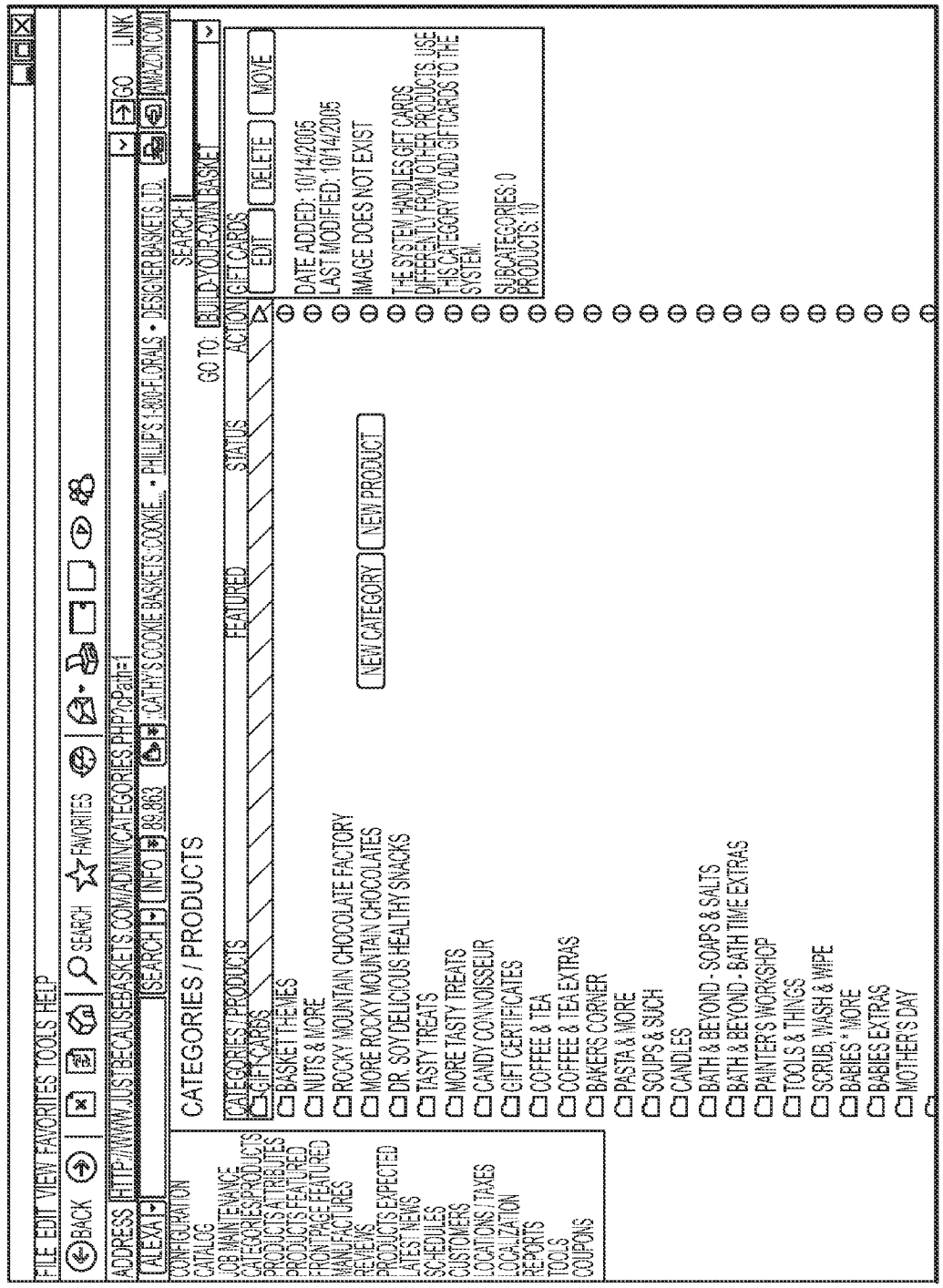
Figure 26:
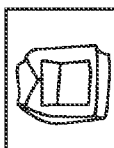
Figure 27:
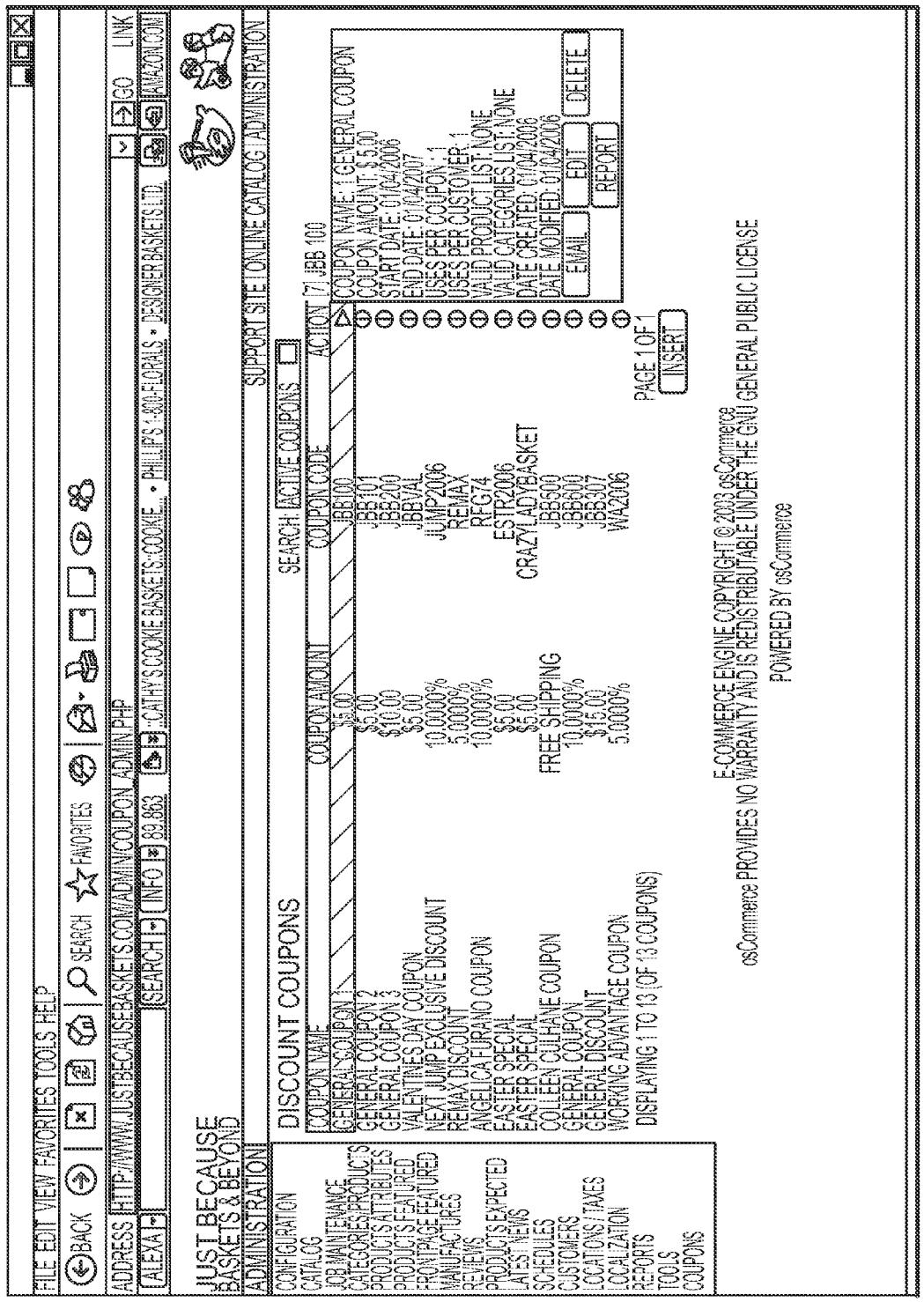

FIG. 25 shows a screenshot associated with selecting a category or product. This screen allows the sender to conveniently access a gift card or any of various products based on category. It will be appreciated that this greatly facilitates selection of products for inclusion in the basket vessel. FIG. 26 shows a number of basket vessels or themes that may be selected. Each of these is indicated as being featured or not featured, and status information, e.g., whether the item is available, is graphically shown. Discounts may also be provided in connection with the basket site. FIG. 27 shows a screenshot presenting different discounts and coupons that may be available.

Figure 28:
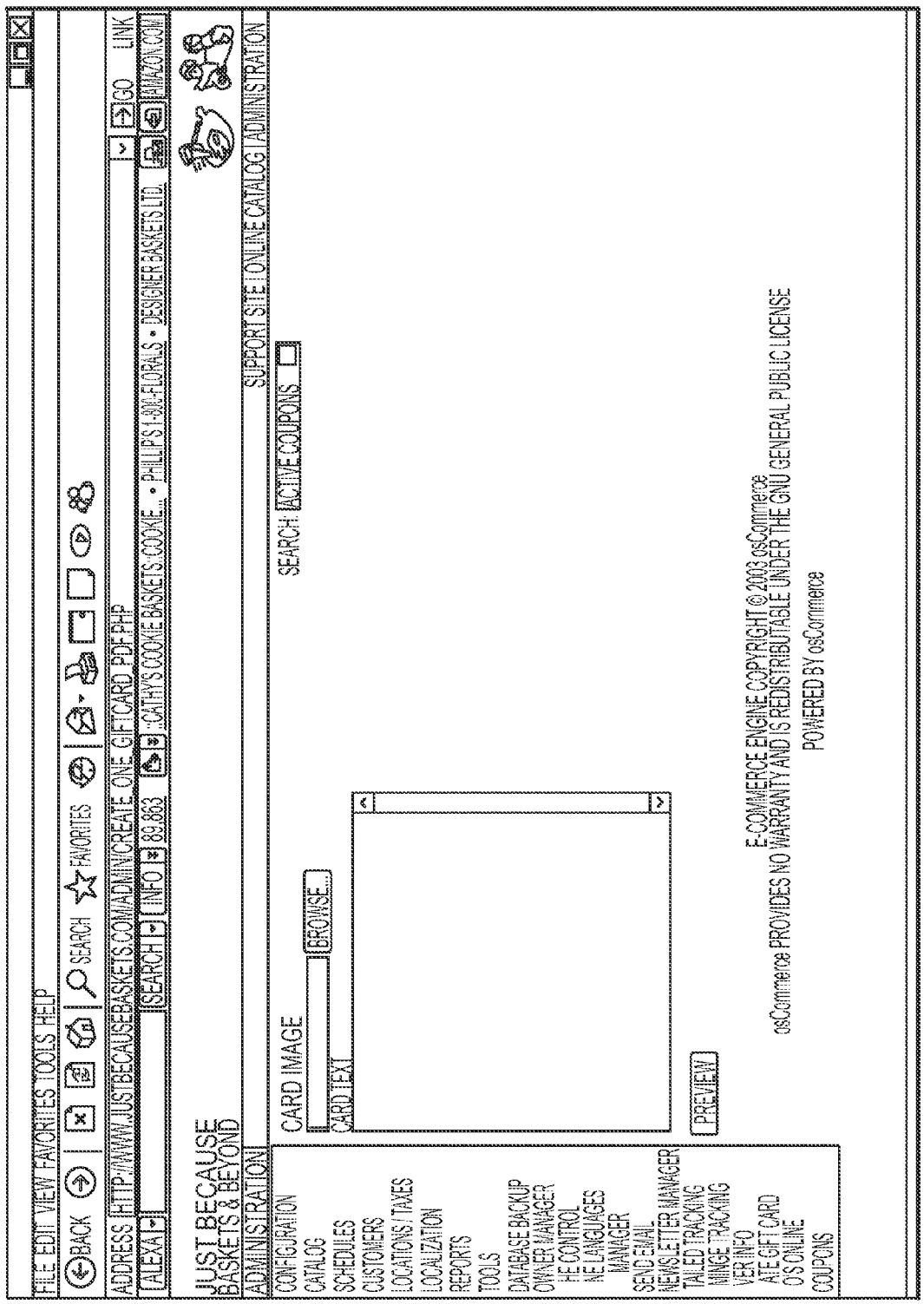

As noted above, senders may elect to construct custom gift cards. An associated screenshot is shown in FIG. 28. In this case, the senders may browse their own computers to select a picture or other image file. The senders may then enter the desired text in an appropriate text box. A preview button shows the cards with a thumbnail of the uploaded images.

Figure 29:
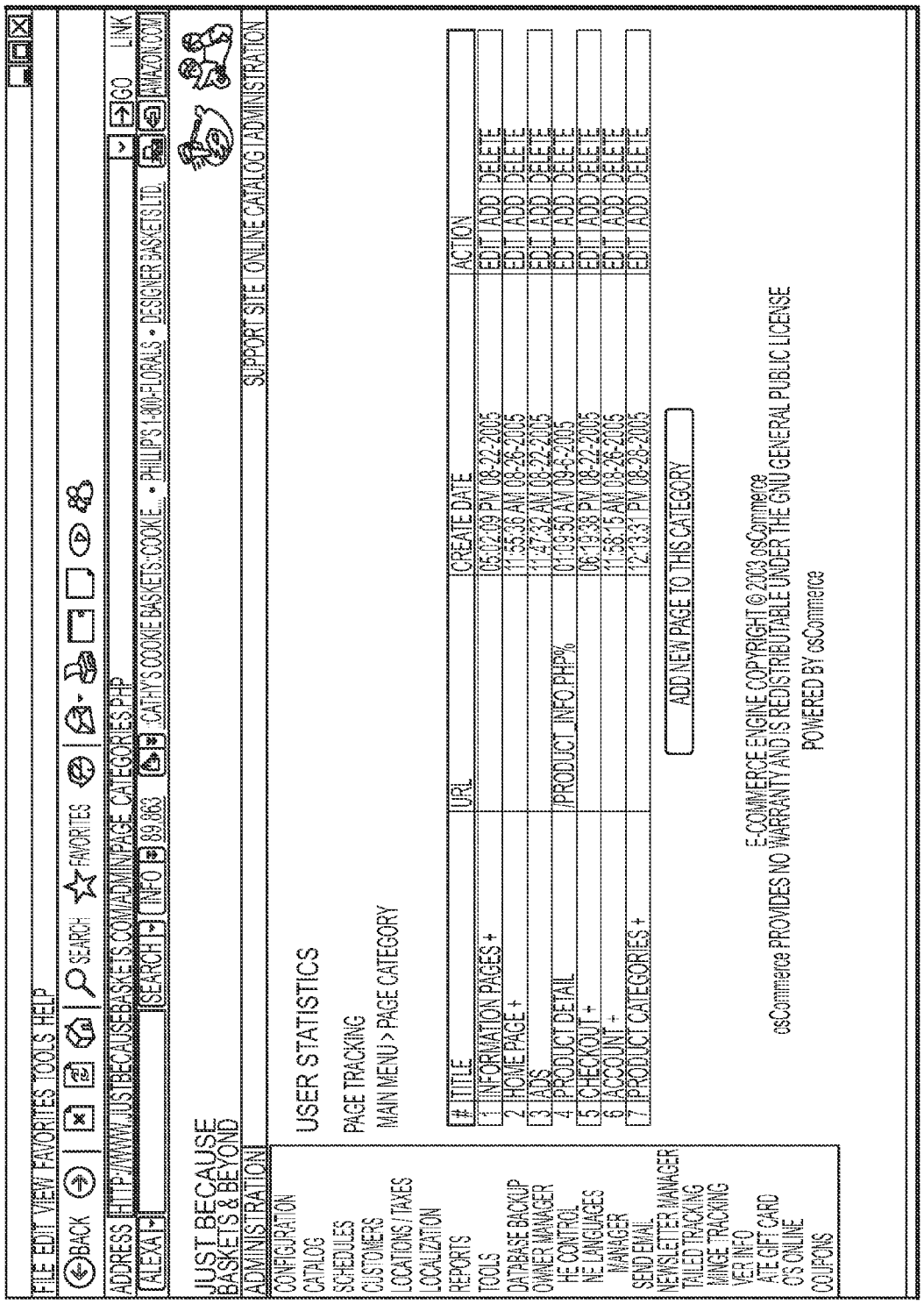
Figure 30:
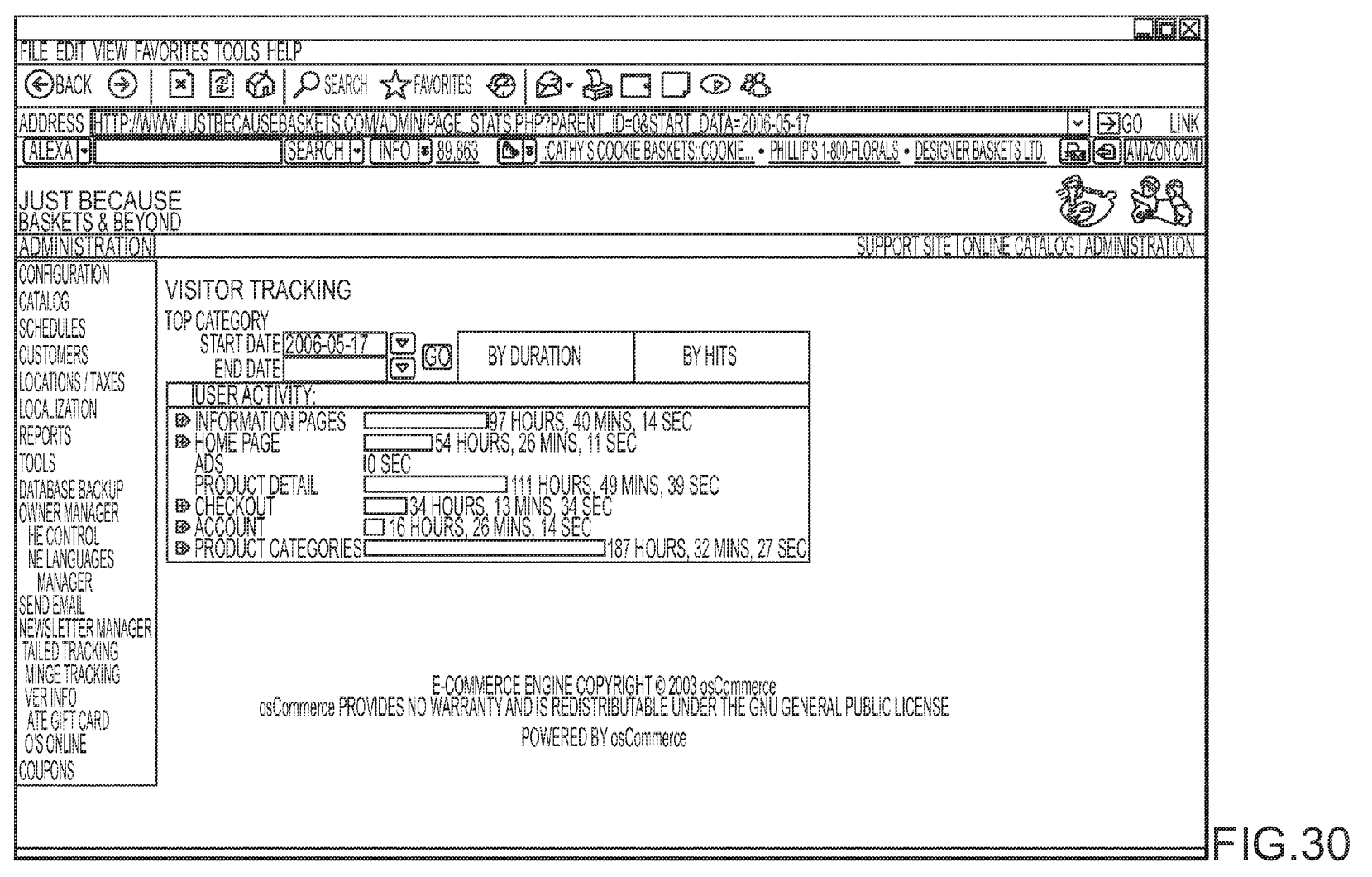
Figure 31:
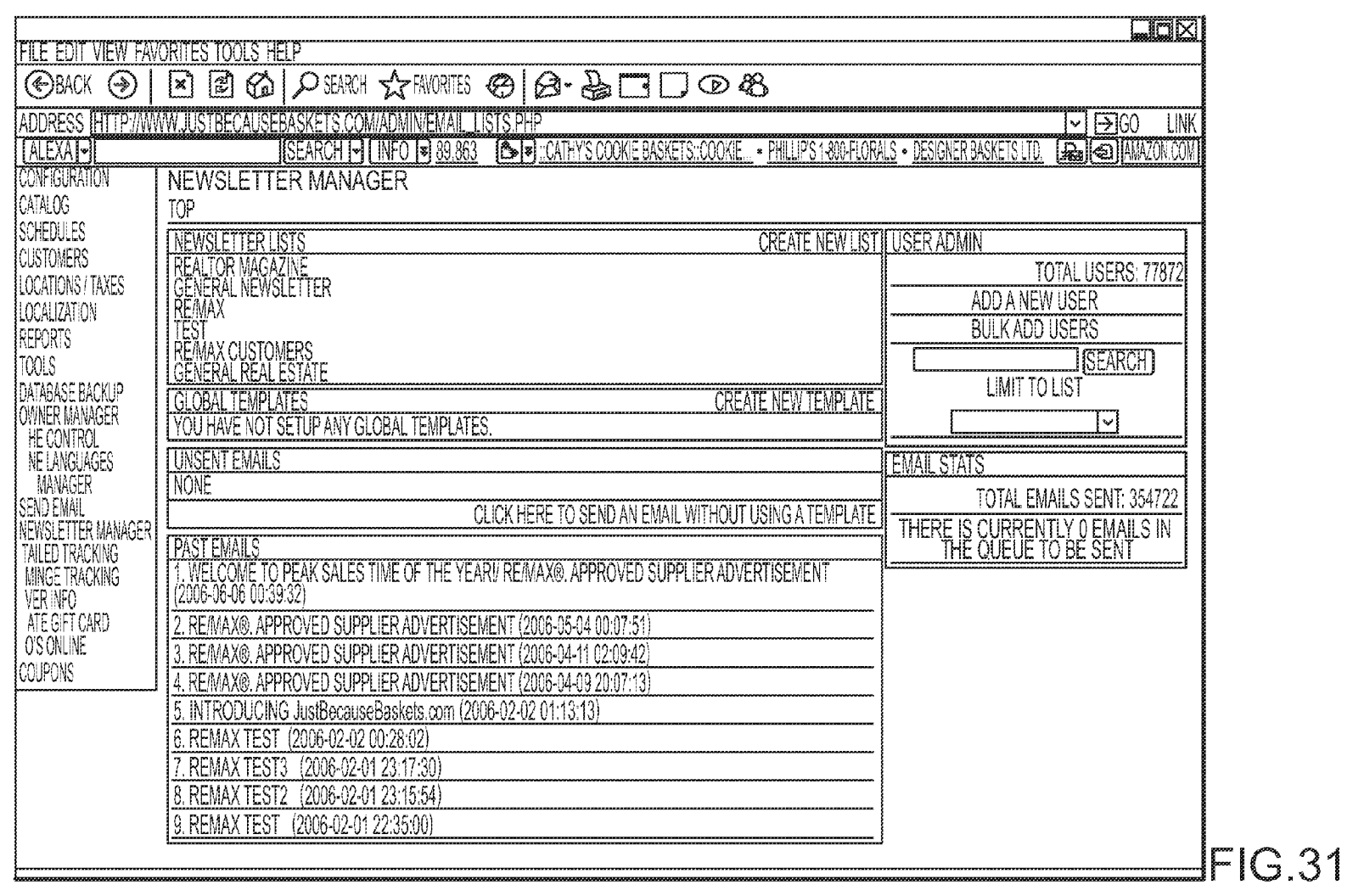

User information may also be compiled and processed in connection with the basket system site. In this regard, FIG. 29 shows a screenshot of a page that identifies different web pages for which statistics may be acquired. FIG. 30 graphically depicts usage of the various pages. It will be appreciated that such use information may be of interest to the basket system site operator or to affiliates or advertisers. FIG. 31 shows a newsletter manager web page. Various newsletters generated in connection with the basket site are identified together with the information regarding past emails.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. For example, although various aspects of the invention are set forth above in the context of server side structure and functionality, it will be appreciated that corresponding structure and functionality implemented wholly or in part at the client side (or in non-client server architectures) are contemplated within the scope of the present invention. The embodiments described herein are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in constructing a custom gift basket, comprising the steps of:
   establishing a web-based tool for receiving inputs defining a desired gift basket;
   storing, in a computer, dimensions for a plurality of products and plurality of basket vessels;
   first receiving from a sender, via said web-based tool, first input information identifying one or more products, from said plurality of products, for inclusion in said gift basket;
   second receiving from said sender, via said web-based tool, second input information identifying a basket vessel, from said plurality of basket vessels, for inclusion in said gift basket;
   making a determination, using a computer processor, whether said collective set of dimensions for said one or more products fall below a minimum threshold value when compared to said dimensions of said basket vessel;
   providing a too few items notice, via said web-based tool, when said collective set of dimensions for said one or more products fall below said minimum threshold value;
   third receiving, via said web-based tool, uploaded graphical information from said sender;
   using said uploaded graphical information to create a card for association with said gift basket;
   upon construction of said gift basket, obtaining an image of said constructed gift basket and said card; and
   transmitting to said sender electronic access to said image of said constructed gift basket and said card.

2. A method as set forth in claim 1, further comprising making a second determination whether said collective set of dimensions for said one or more products exceed a maximum threshold value when compared to said dimensions of said basket vessel.

3. A method as set forth in claim 1, further comprising making a second determination whether said one or more products comprise an aggregated quantity which exceeds a minimum number of products threshold.

4. A method as set forth in claim 3, providing a too many items notice, via said web-based tool, when said collective set of dimensions for said one or more products exceed said maximum threshold value.

5. A method as set forth in claim 1, further comprising the step of, in response to said too few items notice, receiving a modification with respect to at least one of said one or more products and said basket vessel.

6. A method as set forth in claim 1, further comprising the steps of:
   based on said first and second input information, assessing stored information concerning at least one of a size, one or more dimensions, a weight, a cost, and specialized packing requirements for one or more of said one or more products; and
   executing logic for determining a shipping cost based on said first input information, said second input information, and said stored information.

7. A method as set forth in claim 6, wherein said step of first receiving comprises receiving an input identifying a product requiring cold packing and said step of executing said logic for determining said shipping cost comprises accessing information regarding shipping prices for cold pack products.

8. A method as set forth in claim 1, wherein said step of third receiving comprises uploading a picture from said sender's computer in a supported format.

9. A method as set forth in claim 1, wherein said step of third receiving comprises uploading a logo from said sender's computer in a supported format.

10. A method as set forth in claim 1, wherein said step of transmitting comprises emailing said image to said sender.

11. A method as set forth in claim 1, wherein said step of transmitting comprises associating said image of said constructed gift basket with a file of said sender and providing access to said file via a public network.

12. A method for use in constructing a custom gift basket, comprising the steps of:
   storing, in a computer, dimensions for a plurality of products and plurality of basket vessels;
   first receiving first input information identifying a basket vessel, from said plurality of basket vessels, for inclusion in said gift basket;
   second receiving second input information identifying one or more products, from said plurality of products, for inclusion in said basket vessel;
   making a first determination, using a computer processor, whether said collective set of dimensions for said one or more products fall below a minimum threshold value when compared to said dimensions of said basket vessel;
   transmitting a too few items notice, via said web-based tool, when said collective set of dimensions for said one or more products fall below said minimum threshold value;
   making a second determination, using a computer processor, whether said collective set of dimensions for said one or more products exceed a maximum threshold value when compared to said dimensions of said basket vessel;

transmitting a too many items notice, via said web-based tool, when said collective set of dimensions for said one or more products exceed said maximum threshold value;

accessing stored information concerning said dimensions, a volume, or a weight for said basket vessel and one or more of said products;

third receiving information regarding a desired method of shipping for said gift basket; and based on said stored information and said desired method of shipping, determining a cumulative shipping cost for said gift basket as constructed and packaged for shipping.

13. A method as set forth in claim 12, further comprising the step of fourth receiving uploaded graphical information from said sender.

14. A method as set forth in claim 13, wherein said step of fourth receiving comprises uploading a picture from said sender's computer in a supported format.

15. A method as set forth in claim 13, wherein said step of fourth receiving comprises uploading a logo from said sender's computer in a supported format.

16. A method as set forth in claim 13, further comprising the step of using said uploaded graphical information to create a card for association with said gift basket.

17. A method as set forth in claim 16, further comprising the step of obtaining, upon construction of said gift basket, an image of said constructed gift basket and said card.

18. A method as set forth in claim 17, further comprising the step of providing to said sender electronic access to said image of said constructed gift basket and said card.

19. A method as set forth in claim 18, wherein said step of providing comprises emailing said image to said sender.

20. A method as set forth in claim 18, wherein said step of providing comprises providing access to a file of said image of said constructed gift basket to said sender via a public network.

21. A method as set forth in claim 12, wherein said step of first receiving comprises receiving an input identifying a product requiring cold packing and said step of determining said cumulative shipping cost comprises accessing stored information regarding shipping prices for cold pack products.

22. An apparatus for use in constructing a custom gift basket, comprising:
a computer-readable storage medium comprising:
dimensions for a plurality of products and a plurality of basket vessels;
information concerning specialized packing requirements;
an input module that receives first and second input information from a sender, via a public network, wherein said first input information identifies a basket vessel for inclusion in said gift basket and said second input information identifies one or more products, from said plurality of products, for inclusion in said basket vessel;
a computer processor configured to:
receive said first and second input information;
make a first determination whether said collective set of dimensions for said one or more products fall below a minimum threshold value when compared to said dimensions of said basket vessel;
make a first determination whether said collective set of dimensions for said one or more products exceed a maximum threshold value when compared to said dimensions of said basket vessel;
transmit a too few items notice when said collective set of dimensions for said one or more products fall below said minimum threshold value;
transmit a too many items notice when said collective set of dimensions for said one or more products exceed said maximum threshold value;
determine a cumulative shipping cost for said gift basket as constructed and packaged for shipping using said dimensions for said basket vessel and said one or more products.

23. An apparatus as set forth in claim 22, wherein said input module is further operative for receiving uploaded graphical information from said sender.

24. An apparatus as set forth in claim 23, wherein said graphical information comprises a picture from said sender's computer in a supported format.

25. An apparatus as set forth in claim 23, wherein said graphical information comprises a logo from said sender's computer in a supported format.

26. An apparatus as set forth in claim 23, wherein said computer processor is further operative to create a card for association with said gift basket, and wherein said card includes said uploaded graphical information.

27. An apparatus as set forth in claim 26, wherein said input module is further operative, upon construction of said gift basket, to receive an image of said constructed gift basket and said card.

28. An apparatus as set forth in claim 27, wherein said computer processor is further operative for providing to said sender electronic access to said image of said constructed gift basket and said card.

29. An apparatus as set forth in claim 28, wherein said electronic access comprises an email containing said image.

30. An apparatus as set forth in claim 28, wherein said electronic access comprises access to a file containing said image via a public network.

31. An apparatus as set forth in claim 22, wherein said computer processor is further operative to make a determination regarding whether or not to cold pack said gift basket for purposes of shipping, and wherein said cumulative shipping cost is based, at least in part, on said determination.

* * * * *

UNITED STATES PATENT AND TRADEMARK OFFICE
CERTIFICATE OF CORRECTION

PATENT NO. : 7,729,952 B1 Page 1 of 1
APPLICATION NO. : 11/832503
DATED : June 1, 2010
INVENTOR(S) : Kulesza et al.

It is certified that error appears in the above-identified patent and that said Letters Patent is hereby corrected as shown below:

Column 1, line 21, delete "eases" and insert therefor --cases--.

Signed and Sealed this

Third Day of August, 2010

David J. Kappos
*Director of the United States Patent and Trademark Office*